US010042871B2

(12) United States Patent
Fontebride et al.

(10) Patent No.: US 10,042,871 B2
(45) Date of Patent: Aug. 7, 2018

(54) CONTENT MANAGEMENT IN A TRAVEL MANAGEMENT SYSTEM

(71) Applicant: Amadeus S.A.S., Sophia Antipolis (FR)

(72) Inventors: Vanessa Fontebride, Le Rouret (FR); Christel Charrat, La Turbie (FR); Ludovic Le Sinq, Valbonne (FR); Marion Francois, Antibes (FR); Pierre Gadeyne, Mouans-Sartoux (FR)

(73) Assignee: AMADEAUS S.A.S., Biot (FR)

( * ) Notice: Subject to any disclaimer, the term of this patent is extended or adjusted under 35 U.S.C. 154(b) by 736 days.

(21) Appl. No.: 14/291,837

(22) Filed: May 30, 2014

(65) Prior Publication Data

US 2015/0347476 A1    Dec. 3, 2015

(51) Int. Cl.
*G06F 17/30*    (2006.01)
*G06Q 10/02*    (2012.01)

(52) U.S. Cl.
CPC .. *G06F 17/30312* (2013.01); *G06F 17/30876* (2013.01); *G06F 17/30908* (2013.01); *G06Q 10/02* (2013.01)

(58) Field of Classification Search
CPC ......... G06F 17/30554; G06F 17/30389; G06F 17/30386; G06F 17/30424; G06F 17/30908; G06F 17/30312
See application file for complete search history.

(56) References Cited

U.S. PATENT DOCUMENTS

| 5,201,106 A | * | 4/1993 | Moore | B23P 19/047 29/235 |
|---|---|---|---|---|
| 5,253,166 A | * | 10/1993 | Dettelbach | G06Q 10/02 705/5 |
| 5,648,900 A | | 7/1997 | Bowen et al. | |

(Continued)

FOREIGN PATENT DOCUMENTS

| EP | 1843290 A1 | 10/2007 |
|---|---|---|
| EP | 2129081 A1 | 12/2009 |

(Continued)

OTHER PUBLICATIONS

Sarang, "Java Programming", 2012, The McGraw-HIll Companies.*

(Continued)

*Primary Examiner* — Rehana Perveen
*Assistant Examiner* — Huen Wong
(74) *Attorney, Agent, or Firm* — Thompson Hine LLP

(57) ABSTRACT

Methods, apparatus, and computer program products for managing content in a travel management system. A standard data element and a non-standard data element comprising the content are received from one or more content providers. A first data container for the standard data element and a second data container for the non-standard data element are created in an extended record data structure. The first data container includes a common record identifier and first data values for first attributes corresponding to the standard data element. The second data container includes (Continued)

the common record identifier and second data values corresponding to second attributes for the non-standard data element. The travel management system manages access to the first container and the second container in the extended record data structure based on the common record identifier.

23 Claims, 17 Drawing Sheets

(56) References Cited

U.S. PATENT DOCUMENTS

| | | | |
|---|---|---|---|
| 5,761,493 A * | 6/1998 | Blakeley | G06F 8/315 |
| 5,832,453 A * | 11/1998 | O'Brien | G06Q 10/02 705/6 |
| 5,857,182 A * | 1/1999 | DeMichiel | G06F 17/30607 |
| 5,948,040 A * | 9/1999 | DeLorme | G01C 21/36 340/990 |
| 6,085,198 A * | 7/2000 | Skinner | G06F 8/315 |
| 6,292,933 B1 * | 9/2001 | Bahrs | H02M 3/285 707/999.202 |
| 6,654,029 B1 * | 11/2003 | Chiu | G06T 1/00 715/717 |
| 7,286,998 B2 * | 10/2007 | Sauser | G06Q 10/02 705/7.37 |
| 7,313,548 B2 * | 12/2007 | Sauser | G06Q 10/02 704/8 |
| 7,451,392 B1 | 11/2008 | Chalecki et al. | |
| 7,493,261 B2 | 2/2009 | Chen et al. | |
| 7,499,864 B2 | 3/2009 | Campbell et al. | |
| 7,805,323 B2 | 9/2010 | Fitzgerald et al. | |
| 8,209,200 B2 | 6/2012 | Sokel et al. | |
| 9,367,563 B2 * | 6/2016 | Fontebride | G06F 17/3023 |
| 2002/0059280 A1 * | 5/2002 | Slesinsky | G06F 8/65 |
| 2003/0120526 A1 | 6/2003 | Altman et al. | |
| 2003/0144867 A1 * | 7/2003 | Campbell | G06Q 10/02 705/5 |
| 2003/0163479 A1 * | 8/2003 | Mathews | G06F 17/30607 |
| 2003/0167355 A1 * | 9/2003 | Smith | G06F 8/20 719/328 |
| 2003/0191803 A1 * | 10/2003 | Chinnici | G06F 9/547 709/203 |
| 2004/0002939 A1 | 1/2004 | Arora et al. | |
| 2004/0139095 A1 | 7/2004 | Trastour et al. | |
| 2004/0249680 A1 | 12/2004 | Liew et al. | |
| 2005/0192851 A1 * | 9/2005 | Rangnekar | G06Q 10/02 705/5 |
| 2005/0258231 A1 * | 11/2005 | Wiater | G06Q 10/087 235/375 |
| 2006/0145852 A1 * | 7/2006 | McElhannon | G06Q 90/00 340/572.1 |
| 2006/0190497 A1 * | 8/2006 | Inturi | G06F 17/30297 |
| 2006/0206523 A1 | 9/2006 | Gaurav et al. | |
| 2006/0235852 A1 | 10/2006 | Gaug | |
| 2007/0073706 A1 | 3/2007 | Ebie et al. | |
| 2007/0192147 A1 | 8/2007 | Liew et al. | |
| 2007/0260495 A1 | 11/2007 | Mace et al. | |
| 2008/0222517 A1 | 9/2008 | Halim et al. | |
| 2008/0319808 A1 | 12/2008 | Wofford et al. | |
| 2009/0037212 A1 | 2/2009 | Chen et al. | |
| 2009/0138813 A1 | 5/2009 | LaMontagne | |
| 2009/0287701 A1 | 11/2009 | Breaker et al. | |
| 2009/0292745 A1 | 11/2009 | Bose et al. | |
| 2010/0036867 A1 | 2/2010 | Mitchell | |
| 2010/0191553 A1 | 7/2010 | McIntosh et al. | |
| 2010/0208289 A1 * | 8/2010 | Mateer | G06Q 10/08 358/1.15 |
| 2010/0211418 A1 * | 8/2010 | Mateer | G06Q 10/02 705/5 |
| 2011/0302185 A1 | 12/2011 | Vincent | |
| 2012/0066008 A1 | 3/2012 | Scudder et al. | |
| 2012/0209640 A1 * | 8/2012 | Hamper | G06Q 40/12 705/5 |
| 2012/0239620 A1 | 9/2012 | Masini et al. | |
| 2012/0239669 A1 * | 9/2012 | Miller | G06F 17/2785 707/755 |
| 2012/0254261 A1 | 10/2012 | Edwards et al. | |
| 2012/0259667 A1 | 10/2012 | Pelissier et al. | |
| 2012/0278334 A1 | 11/2012 | Abjanic | |
| 2013/0103439 A1 | 4/2013 | Vernitsky et al. | |
| 2013/0290324 A1 | 10/2013 | Gibergues et al. | |
| 2014/0379389 A1 | 12/2014 | Bornat et al. | |
| 2015/0012498 A1 * | 1/2015 | Oberoi | G06F 17/30339 707/667 |
| 2015/0039355 A1 | 2/2015 | Gevrey et al. | |
| 2015/0134372 A1 | 5/2015 | Lopez Ruiz et al. | |
| 2015/0134373 A1 | 5/2015 | Le Marier et al. | |
| 2015/0207856 A1 | 7/2015 | Bersin et al. | |
| 2015/0347408 A1 * | 12/2015 | Fontebride | G06F 17/3023 707/638 |
| 2015/0347476 A1 * | 12/2015 | Fontebride | G06F 17/30312 707/741 |
| 2015/0347589 A1 * | 12/2015 | Fontebride | G06F 17/30867 707/752 |
| 2015/0347929 A1 * | 12/2015 | Fontebride | G06Q 10/02 705/5 |
| 2015/0356471 A1 | 12/2015 | Shaw et al. | |
| 2016/0125069 A1 | 5/2016 | Gagniard et al. | |

FOREIGN PATENT DOCUMENTS

| | | | |
|---|---|---|---|
| EP | 2509035 A1 | 10/2012 | |
| FR | 2939934 A1 | 6/2010 | |
| JP | H0773246 A | 3/1995 | |

OTHER PUBLICATIONS

McKinley et al., "Java Overview", Sep. 16, 2003, Michigan State University.*
USPTO, final Office Action issued in U.S. Appl. No. 14/291,892 dated Oct. 19, 2016.
Korean Intellectual Property Office, Official Action issued in Patent Application No. 10-2015-0076587 and English translation thereof dated Jul. 20, 2016.
USPTO, Notice of Allowance issued in U.S. Appl. No. 14/291,758 dated Feb. 23, 2016.
USPTO, Office Action issued in U.S. Appl. No. 14/291,892 dated Jun. 29, 2016.
Korean Intellectual Property Office, Official Action issued in Patent Application No. 10-2015-0076570 and English translation thereof dated Jul. 20, 2016.
Korean Intellectual Property Office, Official Action issued in Patent Application No. 10-2015-0076607 and English translation thereof dated Jul. 20, 2016.
Korean Intellectual Property Office, Official Action dated Jan. 19, 2017 in Patent Application No. 10-2015-0076570.
USPTO, Notice of Allowance dated Feb. 14, 2017 in U.S. Appl. No. 14/291,892.
USPTO, Office Action dated Jun. 9, 2017 in U.S. Appl. No. 14/292,188.
European Patent Office, Search Report issued in Application No. 14305811.3 dated Oct. 14, 2014.
Santiago Comella-Dorda et al., "A Survey of Legacy System Modernization Approaches", Apr. 2000, Retrieved from the Internet: URL:http://www.sei.cmu.edu/reports/00tn003.pdf [retrieved on Sep. 25, 2014].
European Patent Office, Search Report issued in Application No. 14305813.9 dated Oct. 6, 2014.
European Patent Office, Search Report issued in Application No. 14305814 dated Nov. 25, 2014.
European Patent Office, Search Report issued in Application No. 14305812.1 dated Dec. 5, 2014.
Car Reservations Quick Reference, Sabre Travel Network, 2011 [retrieved on Aug. 13, 2014] retrieved from the Internet: <URL: https://richmedia.sabre.com/docs/pdfs/cars6.pdf>.

* cited by examiner

```
fld { key: "address" ctn { fld { Key: "city" str:
"Paris" } fld {key: "street" str: "Avenue des
Champs-Elys\315es 26" } fld {key: "GPS" ctn {
fld { key: "longitude" dbl: 48.869514} fld { key:
"latitude" dbl 2.308459 } } } fld { key: "type" ctn {
fld { str: "House" } fld { str: "View Point" } } } } fld
{ key: "phone" ctn { fld {key: "mobile" str:
"+336123456" } fld { key: "home" str:
"+335551213" } } }
```

ASCII: 411 Bytes

"address":{ "city": "Paris", "street": "26
Avenue des Champs-Elysées",  "GPS":{
"longitude":48.869514,
"latitude":2.308459}, "type":["House",
"View Point"]}, "phone":{
"mobile":"+336123456",
"home":"+335551213"}}

JSON: 220 Bytes

```
00000000  0a 98 01 0a 07 61 64 64  72 65 73 73 8c 01 0a      |.....addressR...|
00000010  0d 0a 04 63 69 74 79 12  05 50 61 72 69 73 0a 26   |...city..Paris.&|
00000020  0a 06 73 74 72 65 65 74  12 1c 41 76 65 6e 75 65   |..street..Avenue|
00000030  20 64 65 73 20 43 68 61  6d 70 72 2d 45 6c 79 73   | des Champs-Elys|
00000040  e9 65 73 20 32 36 0a 32  0a 03 47 50 53 41 03 0a   |.es 26.2..GPSR+.|
00000050  14 0a 09 6c 6f 6e 67 69  74 75 64 65 21 03 0a      |...longitude!...|
00000060  3c 4c 6f 48 40 0a 13 0a  08 6c 61 74 69 74 75 64   |<LoH@....latitud|
00000070  65 41 42 41 29 5a 2e 77  02 40 0a 04 74 79 70      |eABA)Z.w.@...ty |
00000080  70 65 52 17 0a 07 12 05  48 6f 75 73 65 0a 0c 12   |peR.....House...|
00000090  0a 56 69 65 77 20 50 6f  69 6e 74 0a 33 0a 05 70   |.View Point.2..p|
000000a0  68 6f 6e 65 52 2a 0a 14  0a 06 6d 6f 62 69 6c 65   |homeR*....mobile|
000000b0  12 0a 2b 33 33 36 31 32  33 34 35 36 0a 12 0a 04   |..+336123456....|
000000c0  38 30 0d 65 12 0a 2b 33  33 35 35 35 31 32 31 33   |home..+335551213|
```

BINARY 208 Bytes

FIG. 10

```
<?xml version="1.0+ encoding+"UTF-8"?>
<xs:schema>

<xs:complexType name="PhoneType">                                          ┐
        <xs:sequence>                                                          │
            <xs:element name="mobile" type="xs:string" minOccurs="0"/>         │ PhoneType
            <xs:element name="home" type="xs:string"/>                         │
        </xs:sequence>                                                         │
    </xs:complexType>                                                          ┘

<xs:simpleType name="CoordinateType">                                      ┐
        <xs:restriction bas="xs:double">                                       │
            <xs:minInclusive value="-180"/>                                    │
            <xs:maxInclusive value="180"/>                                     │ GPSType
        </xs:restriction>                                                      │
    </xs:simpleType>                                                           │
    <xs:complexType name="GPSType">                                            │
        <xs:attribute name="latitude" type="CoordinateType" use="required"/>   │
        <xs:attribute name="longitude" type="CoordinateType" use="required"/>  │
    </xs:complexType>                                                          ┘

<xs:complexType name="AddressType">                                        ┐
        <xs:sequence>                                                          │
            <xs:element name="city" type="xs:string"/>                         │
            <xs:element name="street" type="xs:string"/>                       │ AddressType
            <xs:element name="gps" type="GPSType" minOccurs="0"/>              │
            <xs:element name="type" minOccurs="0" ... </xs:element>            │
        </xs:sequence>                                                         │
    </xs:complexType>                                                          ┘

<xs:complexType name="LocationType">
    <xs:sequence>
        <xs:element name="address" type="AddressType"/>
        <xs:element name="phone" type="PhoneType" minOccurs="0"/>
    </xs:sequence>
</xs:complexType>
<xs:element name="LOC" type="LocationType"/>
</xs:schema>
```

FIG. 12

CONTENT MANAGEMENT IN A TRAVEL MANAGEMENT SYSTEM

BACKGROUND

The invention generally relates to computers and computer software and, in particular, to methods, apparatus, and computer program products for managing a combination of standard content and non-standard content in a travel management system.

Content management systems can offer access to specific content to one or more clients (e.g., end consumers) connected to the system through dedicated communication networks. With the appearance of a huge number of content distribution providers in each industry area, there is a need for each consumer to be able to access multiple content providers through a unique content management system. For example, in the travel industry, travel management systems can be used to distribute content obtained from a set of travel provider systems (i.e., content providers) to a plurality of travel agency systems (i.e., content consumers).

The travel industry has grown significantly over the past decades. Over the same time period, the services provided by the travel industry have changed significantly such that many services involving heterogeneous content are now offered to end consumers. Further, the travel industry now involves a lot of players ranging from travel providers to end consumers and a huge amount of data that is to be managed among those players. Travel intermediaries, such as global distribution systems (GDS), between the travel provider and the end user provide travel management systems, which allow travel agents to retrieve information from traditional travel providers (e.g., airline providers) or to conduct transactions between end consumers and traditional travel providers.

With the attractiveness of such alternative distribution channels, travel agencies tend to distribute more and more non-GDS content (e.g., hotel, rental cars, etc.) aside from the usual GDS content (e.g., flight or rail content). However, conventional travel management systems cannot directly provide information to the travel agencies related to non-GDS content.

As shown in FIG. 1, a travel management system 1 generally comprises a record data structure, known as a passenger name record (PNR) 900, for storing records associated with GDS content directly received from GDS content providers 40. Each PNR 900 is identified in a database DB by a record locator. Record locators can then be used to access the GDS content and distribute it to client devices, such as travel agents or end consumers systems 60. Specifically, the PNR 900 may maintain a record locator linked with travel data associated with a given passenger or a group of passengers traveling together. The record locator is also known as a confirmation number, reservation number, confirmation code, booking reference, etc. For example, when a reservation is made for a passenger or group of passengers, a PNR is created in the data structure 900. This PNR includes a record locator and data corresponding to the reservation content (e.g., flight data such as arrival time, departure time, etc.).

Currently, travel management systems cannot directly receive non-GDS content from non-GDS travel providers 50 because of standardization constraints. Indeed, the way a travel management systems exchanges content with a standard travel provider 40 is subject to the rules defined by the International Air Transport Association (IATA) defined through the "ATA/IATA Reservations Interline Message Procedures—Passenger" (AIRIMP). Specifically, the messages exchanged between a standard travel provider 40 and the travel content management engine 30 must satisfy a message exchange format TTY (Teletype format) defined by IATA standard. Conventional PNRs 900 are configured to only handle content received in this TTY format.

An industry standard has not been defined as such for the layout and content of a PNR. However, each travel management system (e.g., computer reservation system or CRS) defines its own proprietary standards for the layout and content of the PNR taking into account the limitations of AIRIMP and, in particular, the need to map PNR data easily to AIRIMP messages. Accordingly, there exist many similarities with respect to the data content and format of PNRs maintained by different travel management systems. In particular, each PNR is such that the travel data associated with a record locator are to satisfy a number of predefined types that correspond to the GDS content standardized by IATA (flight data, rail data, etc.). Accordingly, only GDS content (e.g., flight, rail data) can be maintained in the data structure of the PNR 900 in a static format satisfying the constraints related to IATA message exchange standard. Hence, a record cannot be created for non-GDS content (car rental, jet ski, etc).

Conventional travel management systems 1 thus only handle content from GDS travel providers, such as airline providers. A conventional travel management system includes a travel content management engine 30 using many applications. Each application may be related to a specific travel service (e.g., booking, shopping, pricing, etc). In response to a request from a given travel agent (Ai) 70, the travel content management engine 30 can only retrieve content from GDS travel providers 40, generate a record in the PNR 900, and return a representation of the PNR record thus created to the travel agent Ai.

Each travel agent has to be directly connected to a set of non-GDS content providers 50 if the travel agent needs to access non-GDS content, while the travel management system 1 is only directly connected to GDS content providers 40. On the other hand, each travel agent is connected directly to a specific set of travel providers 50 to obtain non-GDS travel content (e.g., taxi, entertainment ticket, etc.). The travel content management engine 30 thus exposes n travel service platforms (one platform 2.1, 2.2, . . . 2.i, 2.n for each travel agent A1 to An), while handling only standard travel content (GDS content) from the standard travel providers 40.

Accordingly, if a given travel agent Ai wishes specific content from a non-standard travel provider 50 (e.g., museum ticketing), the content has to be self-implemented by the travel agent Ai. Such self-implementation is particularly costly and complex for the travel agents.

There is accordingly a need for improved methods, apparatus, and computer program products for managing a combination of standard content and non-standard content in a travel management system.

SUMMARY

The methods, apparatus, and computer program products according to the various embodiments of the invention make it possible for the content management device to directly receive any type of content, while obviating the need for the client device to separately receive non-standard content. Further, the use of a common identifier shared by the standard record data structure and the non-standard record data structure, make it possible for the non-standard data container to manage access to the data elements as if they were stored in a unique record data structure.

BRIEF DESCRIPTION OF THE SEVERAL VIEWS OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 10 is a schematic view of exemplary serialization formats.

FIG. 12 is a schematic view of the exemplary structure description file related to the non-standard data container of FIG. 12.

DETAILED DESCRIPTION

The methods, apparatus, and computer program products according to embodiments of the invention may allow dynamic management of any type of content (e.g., standard content and non-standard content) received from content providers and a centralized storage of records associated with such content independent of the type of the content. The content management system 100 may be based on a client/server architecture enabling reception of client requests.

Figure 2:
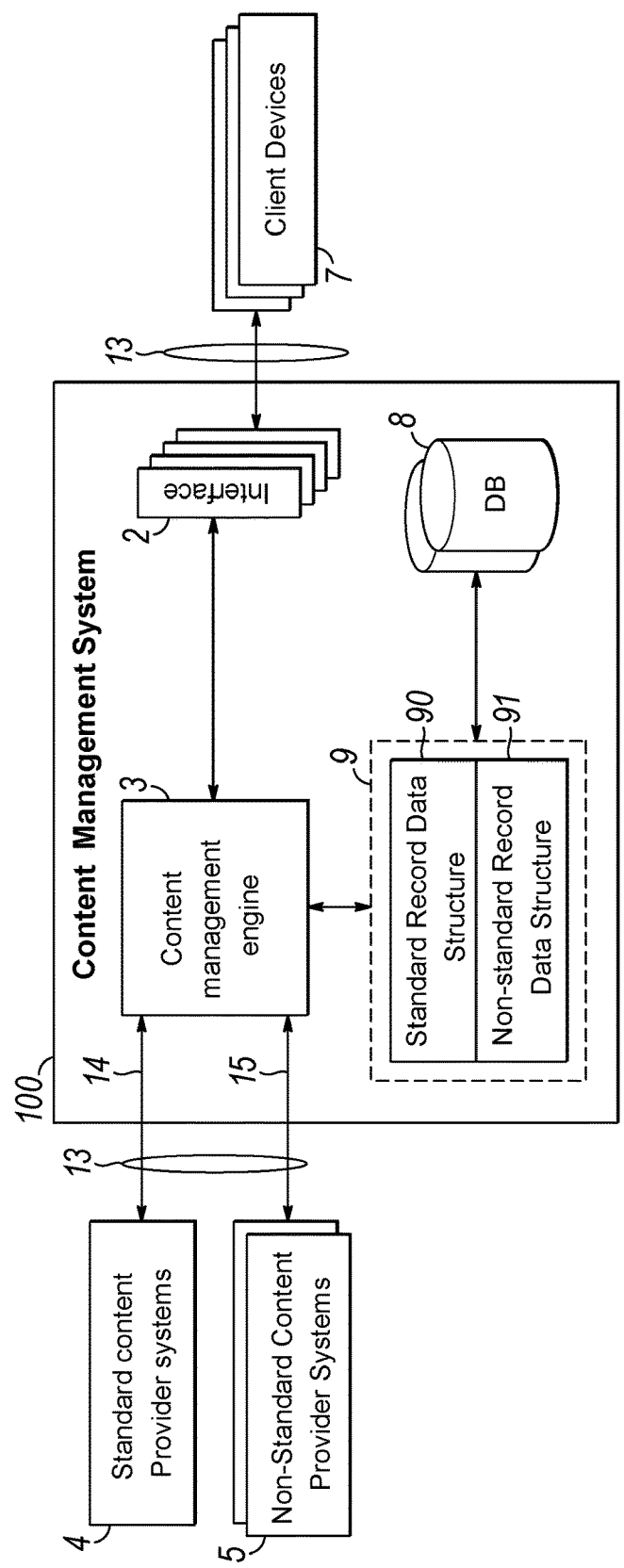
FIG. 2 is a diagrammatic view of a content management system according to certain embodiments including a plurality of computing systems in connection via a network.

With reference to FIG. 2, a content management system 100 is provided through which a number of user clients 7 may directly access through a unique platform to any type of content provided by a set of content provider systems 4, 5. The content handled by the content management system 100 may be received from standard content provider systems 4 communicating with the content management system 100 according to one type of message exchange format 14 (e.g., a predefined standardized message exchange format) or from non-standard content provider systems 5 communicating with the content management system 100 according to a different type of message exchange format 15.

The content management system 100 may be connected to a communication network 13, where the communication network 13 may comprise the Internet, a local area network (LAN), a wide area network (WAN), a cellular voice/data network, one or more high speed bus connections, and/or other such types of communication networks.

The content management system 100 may be dedicated to one or more specific service fields (e.g., the travel field). One or more client devices 7 may each be connected to the communication network 13, such that a user may initialize a service request session with the travel management system 100 and receive content from the travel management system 100 in response to the service request.

Embodiments of the invention may be implemented by a computing system comprising one or more networked computers or servers. The computing system may provide processing and database functions for content management.

Each client device 7 may be a personal computing device, a tablet computer, a thin client terminal, a smartphone, and/or other such computing device. Each client device 7 may host web browsers and/or custom applications software (e.g., a client system) and may include a client user interface.

Each content provider system 4 or 5 may be connected to the communication network 13. Each content provider system 4 or 5 may host one or more websites and/or have a hosting service host one or more websites.

A user (i.e., a traveler) operating one of the client devices 7 may interface with the content management system 100 using the client device 7 during a service request session related to an application (for example, accessed by connecting to a web service). The content management system 100 comprises a content management engine 3 for processing the service request received from the client device 7.

The content management engine 3 may exchange messages with the standard travel providers 4 using the standardized TTY message exchange format according to the IATA standard as the message exchange format 14.

The content management engine 3 may further exchange messages with the non-standard providers 5 through a data exchange unit 11 (FIG. 3), which is also referred to in the present description as a "content access unit". The data exchange unit 11 may use messages defined according to a data description language, such as extensible markup language serving as the message exchange format 15, to communicate with the non-standard content providers, for example in response to a search, book, pricing, issuance, or cancel request from a user client 7 associated with a travel agent entity (e.g., travel agent operator or a travel agent system).

The user may submit the service request to the content management system 100 by entering information at the client device 7 through a user graphical interface generated on the client device 7 by an application executing on the content management system 100 (e.g., in the form of a web service). Information received from the user may be accumulated until the user submits the service request to the content management system 100 (e.g., by performing a submit action).

In response to the user request, the content management engine 3 may request and obtain content from content provider system 4 and/or content provider system 5 respectively according to message exchange format 14 and/or message exchange format 15, and store a record related to the retrieved content in an extended record data structure 9. The extended record data structure 9 may be stored in a context and saved in one or more databases 8 in response to a saving request or periodically. Alternatively, in certain embodiments, the extended record data structure 9 may be directly stored in one or more databases 8.

The extended record data structure 9 includes a standard record data structure 90 for storing records in association with standard data, as well as a non-standard record data structure 91 for storing records in association with non-standard data.

A record comprises a record identifier (or "record locator") in association with related data elements. The record identifier may be of any type and any format, such as a number.

The standard record data structure 90 is static because it is only adapted to store record for predefined types of content (referred to as "standard" content) having one or more attributes among a predefined set of attributes. As used herein, the term "standard" refers to standard content having a predefined format and/or type corresponding to the format and/or types supported by the standard record data structure 90.

A record may be added in the standard recording data structure 90 for a received content including related data elements, if the received content only includes standard data elements. The record includes a record identifier in association with the data elements.

Alternatively, a record may be added to the non-standard recording date structure 91 for a received content including related data elements, if the received content includes only non-standard data elements. The record includes a record identifier in association with at least one non-standard data container including the non-standard data elements.

Further, a record may be added to the standard recording date structure 90 and to the non-standard recording date structure 91 for a received content including related data elements, if the received content includes non-standard data elements and standard record date structure 90. The two records added for the received content standard in the record data structure 90 and in the non-standard record data structure 91 may be both assigned the same record identifier (referred to therein after as a "common record identifier"). The common record identifier is shared between one or more standard data elements (standard content) in the standard record data structure 90 and/or one or more non-standard data containers (comprising non-standard data elements) in the non-standard record data structure 91.

By using a same record identifier in both record data structures 90 and 91 to identify related standard and non-standard data elements, the content management system 100 may effectively manage the two record data structures transparently as if they formed a unique record data structure.

The content management engine 3 may maintain a number of applications associated with different services. The content management engine 3 can execute one or more of these applications depending on the service request received from the client device 7, which may trigger content retrieval from content provider systems and storing of records related to such received content in the extended data structure 9. The content management engine may be further configured to return the response to the service request based on the records stored in the extended record data structure 9 independent of the type of content to the user clients using the content recorded in the record data structure 9. To return the response to the clients, the content management engine 3 may use the data exchange unit 11 (FIG. 3) for generating a uniform representation of the content on the client devices 7, independent of the types of content included in the records retrieved from the extended record data structure 9. The content management engine 3 thus acts as an application aggregator to provide services to the user clients 7.

In an embodiment of the invention, the content management system 100 may be a travel management system. The travel management system 100 may be implemented by an intermediary operator (for example, a Global Distribution System (GDS) in the field of travel) to allow for centralized management of travel content, for example implemented in a GDS (acronym for "Global Distribution System").

Figure 3:
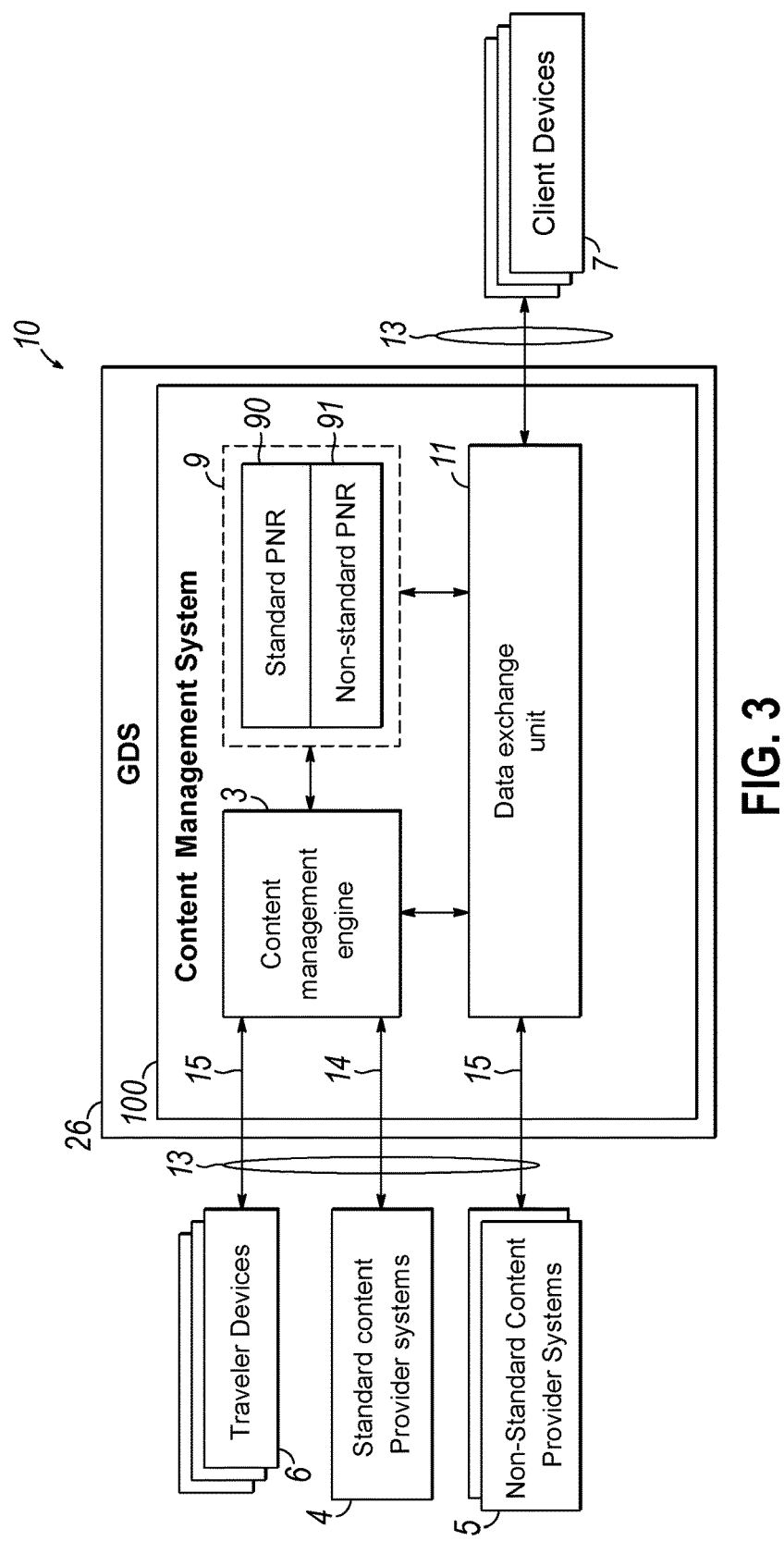
FIG. 3 is a diagrammatic view of an exemplary operating environment including a content management system.

FIG. 3 shows an exemplary operating environment 10 of such a travel management system 100 implemented in a GDS 26. The standard content refers to GDS content complying with IATA constraints (such as flight, rail content) provided by standard travel provider systems 4. The non-standard content can be any type of non-GDS content that does not satisfy IATA constraints (e.g., car rental) provided by non-standard travel provider systems 5 or booked outside the GDS 26. The standard record data structure 90 may be a standard PNR data structure (also referred to hereinafter as a standard passenger name record or standard PNR) that is configured to store standard content. The non-standard record data structure 91 (also referred to hereinafter as non-standard PNR data record) is configured to dynamically record any type of non-standard content without a need to predefine the types and attributes of the non-standard content by hard-coding the data mapping and compilation mechanisms. The standard PNR 90 generally includes a complete set of data for an itinerary of a trip, including segments from multiple carriers, with predefined data structures (e.g., types, attributes, families) and/or other travel services comprising the trip such as hotel and rental car reservations.

The extended record data structure 9 forms an extended travel record (ETR) where each content record can be seamlessly manipulated by the content management engine 3 independent of the type of content associated with the record.

Figure 1:
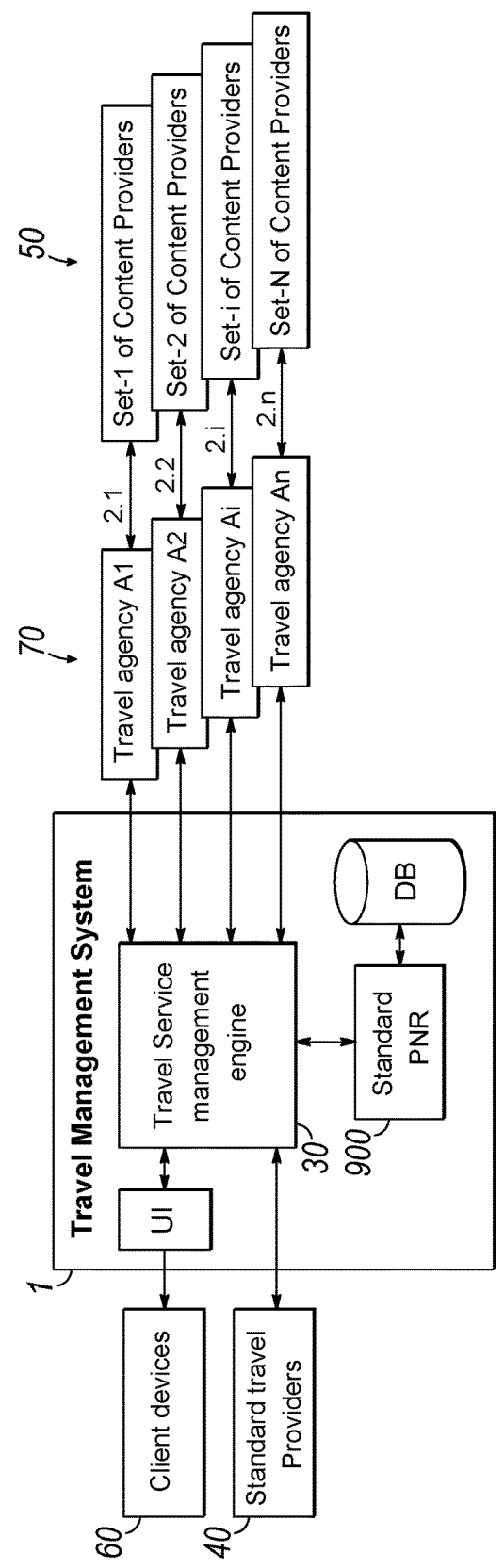
FIG. 1 is a diagrammatic view of a conventional content management system according to the prior art.

The client devices 7 can be associated with a plurality of travel agency systems 70 (FIG. 1) requesting services through respective client interfaces 2 (FIG. 2). More generally, the travel management system 100 can also accessed by different types of client devices submitting different types of requests according to a client/server approach, such as traveler devices 6 through respective user interfaces 2 or even travel provider systems 4 or 5 (for example to exchange content stored in the extended travel record 9).

The standard travel provider systems 4 may include a plurality of carrier systems or traveler systems. The non-standard travel product provider systems 5 may include car rental systems, museum reservation systems, etc. When implemented, the carrier systems may include a computer reservation system (CRS) and/or billing system for the respective airline that enables the GDS 26. The travel agency systems 70 may be configured to reserve and pay for trip tickets and/or additional services provided by non-standard travel providers 5. Some standard travel provider systems 4 may also interact with each other, either directly or through the GDS 26, to enable a validating carrier to sell tickets for seats provided by an operating carrier. The operating carrier may then bill the validating carrier for the services provided.

The GDS 26 may be configured to facilitate communication between the travel providers 4 and 5 and the client devices 7 of the travel agency systems 70 by enabling travel agents, validating carriers, or other indirect sellers to search for available segments and book reservations on one or more carrier systems 4 and search and book additional services (e.g., car rental, museum tickets, etc.) via the GDS 26.

Each travel agency system 70 may include a web server that provides a publicly accessible website. This website may be configured to provide access to travel planning features, such as the ability to search for travel products matching a travel request. To this end, the travel agency system 70 may provide the traveler with access to data from one or more databases hosted by the GDS 26, the travel providers 4 and 5, and the travel agency system 70. In an alternative embodiment of the invention, the travel agency system 70 may be a proprietary system that limits access to travel service providers or travel agents, in which case access may be provided through a private website or other application.

Travelers or travel agents may use the travel agency system 70 to generate and/or search for travel proposals that satisfy a travel request received from the traveler using a specific travel application (e.g., travel planning application).

Traveler devices 6 may be directly connected to the travel management system 100 through a public or private network 13 (e.g., the Internet). The traveler device 6 may be any suitable computing system configured to communicate over the network 13 with the travel management system 100. For example, the traveler device 6 may comprise a desktop, laptop, or tablet computer, a smart phone, or any other computing device that enables a traveler to search for and book travel services over the network 13. In an embodiment of the invention, the traveler device 6 may include a web-browser application that communicates with a web-service application hosted by the content management engine 3 of the travel management system 100 to submit travel requests depending on the web service application.

Alternatively, the traveler device 6 may include a web-browser application that communicates with a web-service application hosted by the travel agency system 70. The web-service application may, in turn, communicate with the travel management system 100 to submit the travel requests depending on the travel service application.

The travel requests may be submitted for example to obtain data related to available travel segments, to generate travel proposals that satisfy the travel request and/or to book auxiliary services (e.g., car rental, jet ski booking, museum ticket booking, etc.) corresponding to non-standard content provided by non-standard providers 5, in relation with a travel provided through the GDS 26 or through another GDS.

Figure 4:
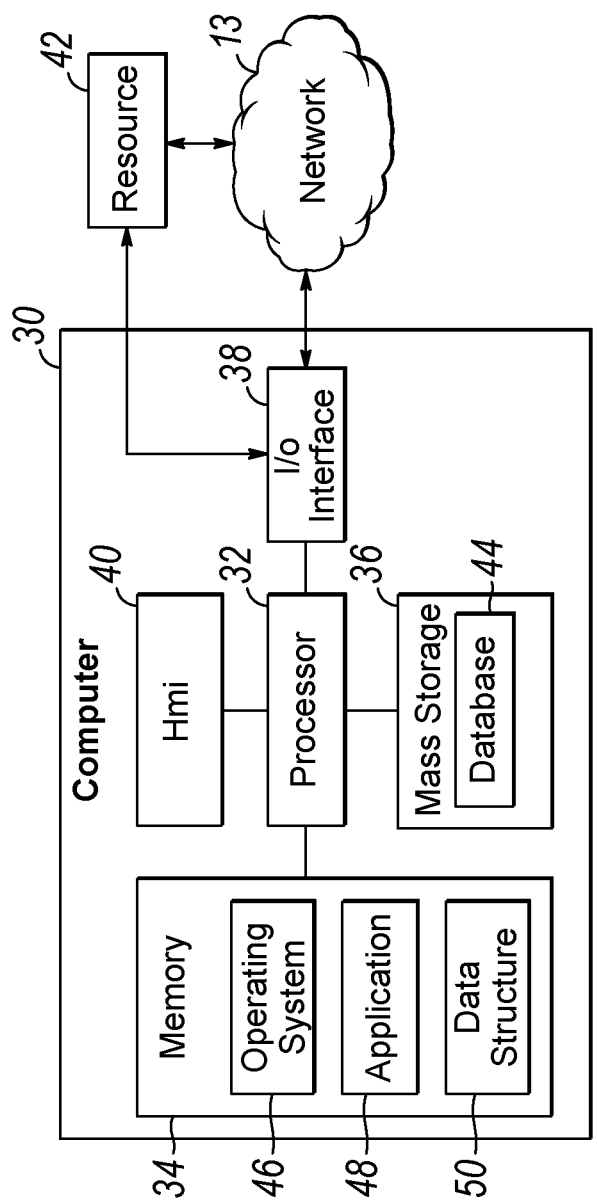
FIG. 4 is a schematic view of an exemplary computing system of FIGS. 2 and 3.

Referring now to FIG. 4, the GDS 26, the travel management system 100, the travel provider systems 4 and 5, the travel agency systems 70, the traveler devices 6 of the operating environment 10 may be implemented on one or more computing devices or systems, referred to collectively as a computer such as computer 30. The computer 30 may include at least one processor 32, a memory 34, a mass storage memory device 36, an input/output (I/O) interface 38, and a Human Machine Interface (HMI) 40. The computer 30 may also be operatively coupled to one or more external resources 42 via the network 13 and/or I/O interface 38. External resources may include, but are not limited to, servers, databases, mass storage devices, peripheral devices, cloud-based network services, or any other suitable computing resource that may used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 44 may reside on the mass storage memory device 36, and may be used to collect and organize data used by the various systems and modules described herein.

Processor 32 may operate under the control of an operating system 46 that resides in memory 34. The operating system 46 may manage computing resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, and/or application 48 to store or manipulate data.

The I/O interface 38 may provide a machine interface that operatively couples the processor 32 to other devices and systems, such as the network 13 and/or external resource 42. The application 48 may thereby work cooperatively with the network 13 and/or external resource 42 by communicating via the I/O interface 38 to provide the various features, functions, applications, processes, and/or modules comprising embodiments of the invention. The application 48 may also have program code that is executed by one or more external resources 42, or otherwise rely on functions and/or signals provided by other system or network components external to the computer 30. Indeed, given the nearly endless hardware and software configurations possible, persons having ordinary skill in the art will understand that embodiments of the invention may include applications that are located externally to the computer 30, distributed among multiple computers or other external resources 42, or provided by computing resources (hardware and software) that are provided as a service over the network 13, such as a cloud computing service.

The HMI 40 may be operatively coupled to the processor 32 of computer 30 in a known manner to allow a user of the computer 30 to interact directly with the computer 30. The HMI 40 may include video and/or alphanumeric displays, a touch screen, a speaker, and any other suitable audio and visual indicators capable of providing information to the user. The HMI 40 may also include input devices and controls such as an alphanumeric keyboard, a pointing device, keypads, pushbuttons, control knobs, microphones, etc., capable of accepting commands or input from the user and transmitting the entered input to the processor 32.

The following description will be made with reference to the content management system 100 of FIG. 3 for illustrative purpose only.

Different travel agents connected to the travel management system 100 through respective travel agency systems 70 can thus directly access through a unique platform to any type of content provided by a set of travel provider systems 4, 5, independent of the type of content (such as standard airline content, taxis, entertainment tickets, etc.). The Travel Management System 100 thus offers the possibility to store not only standard content complying with the standard PNR data structure 90 but also any new type of content (i.e., taxi course, theatre ticket, concert, goodies, etc.) while obviating the need for the travel agencies to book such non-standard content outside of the GDS System by phone, or via the internet, etc.

By appending a non-standard PNR 91 to the standard PNR 90, the travel management system can dynamically and seamlessly provide an unlimited number of travel services to travel agency systems 70.

The two-fold extended travel record 9 thus forms a structured representation of content supplied by the travel provider systems 4, 5 (it may correspond, for example, to a product booked outside the GDS 26), while the records maintained in the ETR 9 may be accessed and managed as if the standard PNR 90 and the non-standard PNR 91 formed a unique record data structure.

A standard data element (e.g., product) in the standard PNR 90 is associated with a set of attributes which can be qualified as optional or mandatory according to the standard layout and format implemented by the GDS 26 to comply with IATA standard.

The data maintained in the extended travel record 9 may be classified into a plurality of families, each family including several data element types such as, for example, the five families represented in Table 1. The ETR 9 is adapted to support any number of new data element types and families.

TABLE 1

| Move | Sleep | Eat and drink | Activities | Services |
|---|---|---|---|---|
| Air | Hotel | Restaurant | Sport Activity | Insurance |
| Ferry | Apartment | Bar & Club | Shopping | Visa |
| Cruise | Camping | Other | Show & Event | Goodies |
| Rail | B&B | | Excursion | Documentation |
| Coach | Other | | Visit | Leisure equipment |
| Urban transportation | | | Other | Local services |
| Transfer | | | | |
| Taxi | | | | Meeting Vaccine |
| Car | | | | Other |

TABLE 1-continued

| Move | Sleep | Eat and drink | Activities | Services |
|---|---|---|---|---|
| Bike Parking | | | | |

The content management engine 3 is configured to manage heterogeneous content of the ETR 9. This content may include:
- adding new data elements from any travel provider system 4 or 5 in the extended travel record 9, independent of the content type, for example in response to requests from travel agency systems 70;
- modifying data elements in the extended travel record 9 (for example, by changing the start date of a "museum" product corresponding to a pre-booking of two entrances for a museum);
- deleting data elements from the extended travel record 9 (for example, by removing the booking of the "museum" product from the extended travel record if a user has decided to remove this product from his trip to New York).
- retrieving data elements from the extended travel record 9 (for example, by retrieving all the structured attributes of the "museum" product in a specific travel record).

The extended travel record 9 may accordingly store both non-standard content and standard content as if they were part of a unique record data structure (PNR). The content management engine 3 manages the heterogeneous content maintained in the extended travel record 9 in a transparent way for the user clients. The extended travel record 9 is further flexible and adapted to any type of new content (e.g., taxi, metro, bus, museum ticketing, etc.) independent of the attributes associated with the new content.

The standard PNR 90 is organized according to the IATA standard. When a given set of data elements is transmitted from a standard travel provider system 4 to the content management engine 3 through a message according to the message exchange format 14 in an application flow associated with a given service (e.g., booking management flow), the following actions may be performed by the content management engine 3:
  i. the data may be extracted by the content management engine 3 from the incoming message transmitted by the standard travel provider system 4, and
  ii. a record may be added in the standard PNR 90, the record comprising a record identifier in association with the data elements corresponding to the data extracted by the content management engine 3 (content data).

The data thus obtained may be used to build another message to be sent to a next application in the application flow.

When the application flow involves a set of chained internal applications, action i, may be performed by a given internal application in the application flow while step ii may be triggered by another application in the flow.

The data added in the standard PNR 90 can have a limited number of predefined attributes only and are to satisfy one or more predefined types and formats (standardized attributes).

The non-standard PNR 91 does not comply with the rules and historical constraints of the standard (IATA content definition, TTY messages, IATA messages). However, the non-standard content can be part of the extended travel record 9 and accessed seamlessly and transparently by the applications executed by the content management engine 3.

The extended travel record 9 thus may store any type of standard content (e.g., GDS content such as flight, hotel, car, cruise, insurance, ferry) and non-standard content (such as bus, taxi, restaurant, etc.) in a structured way and in a universal format.

To dynamically manage any type of content, the content management engine 3 is configured to create a non-standard data container in response to received content comprising non-standard data elements transmitted to the travel management system 100 from non-standard content provider systems 5. The non-standard data container may dynamically adapt to the format of the internal application of the content management system which receives the data element due to auto-serialization properties of the non-standard data container. When the receiving internal application is an application of an application flow involving a set of chained applications (internal applications), the non-standard data container may dynamically adapt to the format of each internal application to which it is transmitted using the auto-serialization properties of the non-standard data container.

More specifically, when the travel management system 100 connects to a new travel provider 5 providing a non-standard content type, the non-standard data elements received from the non-standard content provider system 5 are stored in such non-standard data container assigned the non-standard content type. A record can then be added in the non-standard record data structure 91 by an internal application (for example, in an application flow). The record may comprise a record identifier and the non-standard data container having the non-standard content type. The non-standard data container may comprise a list of attributes, each attribute being represented by a key and a value. Each attribute may itself comprise a list of sub-attributes, each being represented by a key and a value (similarly for the sub-attributes, etc.). Each attribute key is associated with a name and type. The non-standard data container is configured to self-implement itself independent of the structure that it represents or the data that it contains: for read only access or read/write access (i.e., get or set) of any value of any attribute that is part of the non-standard data container, the non-standard data container enables such access via a method neither depending on the key name nor on the key type, without a need to implement getter/setter methods by hard-coding.

The non-standard data container can accordingly be used to create a new record in the non-standard PNR 91 independent of the type of content. The new record can be transparently accessed by the content management engine 3 for any type of content management actions, for example to execute travel applications, generate a display of service request result to the client devices 7, or transmit content to external devices (e.g., travel provider systems or travel devices).

Figure 5:
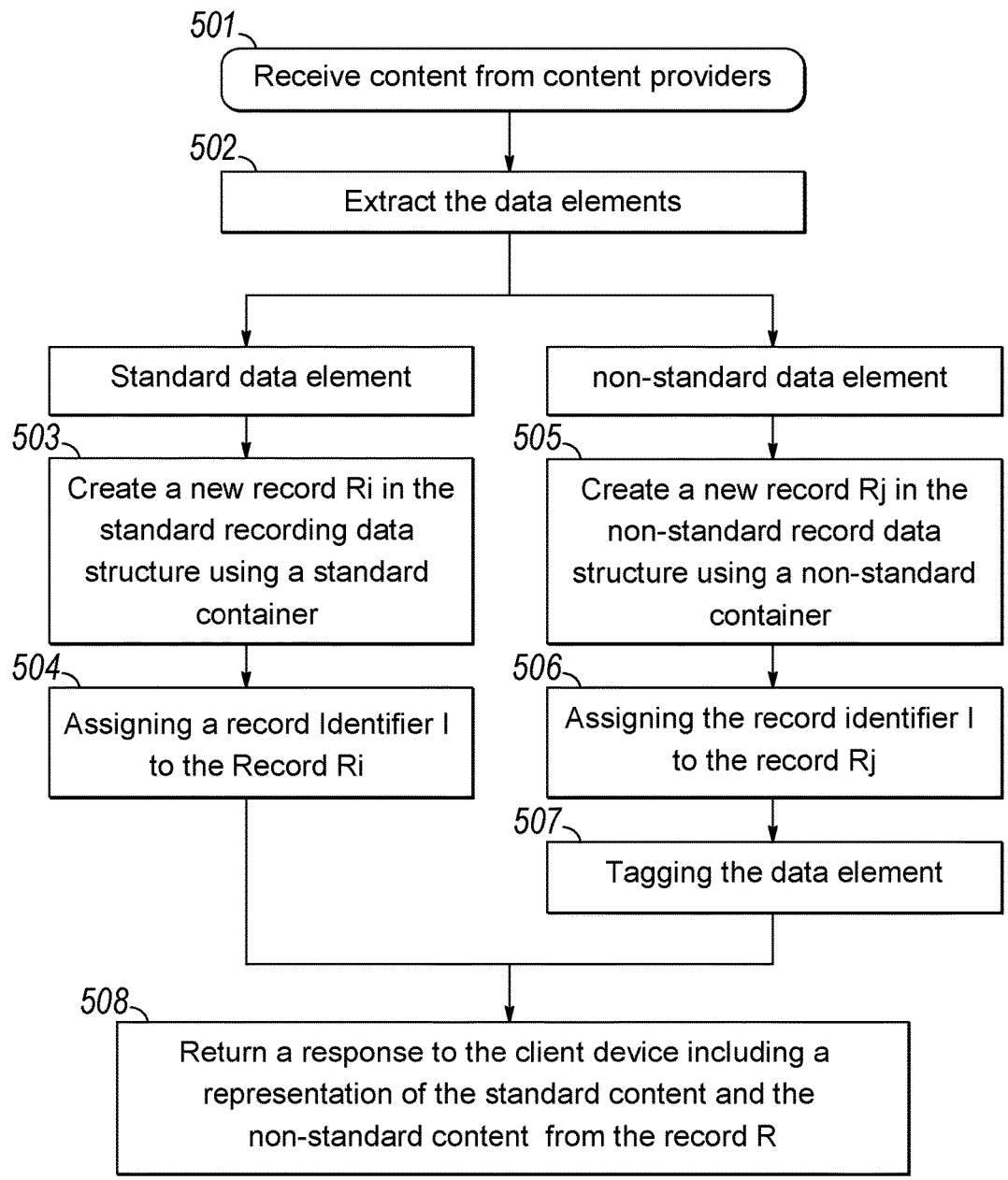
FIG. 5 is a flowchart depicting a process that may be executed to add new content in the extended record data structure.

Referring now to FIG. 5, a flowchart is presented that depicts a process for creating a new record in the extended travel record 9 in response to content received from one or more travel provider systems.

In block 501, the content management engine 3 may receive content from one or more travel providers 4, 5 through message exchange format 14 and/or message exchange format 15, for example, in response to a service request from a client device 7, such as a travel agency system.

The content may include a plurality of related data elements, for example data elements related to the same travel, such as a flight product (standard data element) and a taxi product (non-standard data element) that are sequentially received. The data elements associated with a common content may be sequentially received or received in parallel. The data elements may include information for identifying that they are part of the same common content. The data elements may comprise standard data elements (e.g., a flight product) and/or non-standard data elements (e.g., a taxi product).

The standard data elements (e.g., GDS content) may be received according to the message exchange format 14, such as TTY. The non-standard data elements may be received by the data exchange unit 11 in the form of a message defined according to a markup description language such as XML according to the message exchange format 15. The following description will be made with reference to XML message (also referred to as an XML document or file) for data interchange between the travel management system 100 and external systems. The data exchange message may includ a structure description file to describe the structure of the message and the types and format of the data contained in the message. For example, for data exchange messages of the type XML, XML XSD schemas may be used as structure description files to provide a representation of the structure of the attributes of the XML message.

In block 502, for each data element received for the common content, the content management engine 3 may extract the data elements. The content extraction may be performed by an internal application of the content management engine 3.

If the data element corresponds to standard content (e.g., flight product), the content management engine 3 creates a record R in the standard PNR 90 for the standard content (e.g., flight product) using a standard data container (also referred to hereinafter as "standard container") in block 503 having the type of the data element (e.g., flight type). The standard data container may be a static container configured for predefined types of data elements (standard data elements). The record R may be assigned a record identifier I (block 504) and may be associated with the standard data container in block 505. The record may be saved in a temporary context and/or in at least one database 8.

If the data element corresponds to non-standard content (e.g., taxi product), the content management engine 3 creates a record R in the non-standard PNR 90 for the standard content (e.g., flight product) using the non-standard data container (also referred to hereinafter as "non-standard container") in block 505. An internal application of the application flow may trigger block 505. The internal application triggering the creation of the record in the ETR may be different from the internal application receiving the non-standard data element from the data exchange unit 11. For example, an internal application A1 may receive the non-standard data element in the format F1 of the application A1, the non-standard data element may be transmitted to other internal applications in the chain until it arrives at an internal application An in the format Fn of the application An, and finally the application An triggers the creation of a record in the non-standard record data structure 91 (the non-standard data container having the format Fn). The non-standard data container may be assigned to the type of the data element (e.g., taxi type).

The non-standard data container is adapted to contain any type of data element (non-standard data element). The record R may be assigned the same record identifier I and may be associated with the non-standard data container in block 506. The record may be stored in a temporary context and/or in at least one database.

In one embodiment, the non-standard data container created in block 506 may be further assigned a tag in block 507. Such tag may be used by the content management engine 3 when accessing the record R, for example to identify the data elements that are not to be sent to client devices 7.

Accordingly, a unique record identifier I may be created in the standard PNR 90 and the non-standard PNR 91 for all standard data elements and non-standard data elements corresponding to common content (related data elements) in block 508. This common record identifier can be thus shared to manipulate records corresponding to heterogeneous data elements as if they were maintained in a unique record data structure. For example, the record identifier I may be used by the content management engine 3 to allow an application read/write non-standard data elements, independent of the type of the data.

In a simplified example, the extended travel record 9 may, for example, include several records that are assigned a common record identifier ID1 that is commonly associated with the following set of data elements:
- standard data element D1 of type 1
- standard data element D2 of type 2
- standard data element D3 of type 3
- non-standard data element D4 of type 4-tagged
- non-standard data element D5 of type 5
- non-standard data element D6 of type 2-tagged The records for the data elements D1, D2, D3 are maintained in the standard record data structure 90 in association with the record identifier ID1 (in standard data containers). The standard data container used to contain standard data elements is specifically adapted to contain data elements having a predefined type and set of attributes in accordance with IATA standard. The standard data container is thus only adapted to standardized data formats and data types.

The records for the data elements D4, D5, D6 are maintained in the non-standard record data structure 90 in association with the record identifier ID1 (in non-standard data containers). The non-standard data container can be created independent of the type, attributes and format of the non-standard data elements. Each attribute can itself comprise a number of sub-attributes.

The content management engine 3 accordingly uses the non-standard data container to dynamically create new type of content in the extended travel record 9 independent of the type of the content. The non-standard data container may be a polymorphic data container which, unlike a standard container, is not hard-coded into the code for a given element. In contrast, the form it has to take may be dynamically defined. The non-standard data container may have also auto-serialization/deserialization properties. In certain embodiments, the non-standard data container may be a technical object represented by a business object model 21 of the internal application manipulating it, which facilitates the integration of new content in the extended travel record 9. The business object model 21 is the basis for the natural-language vocabulary used in business rules and logic applied to the new content. The elements of the business object model 21 map to those of a corresponding execution domain object model.

Figure 6:
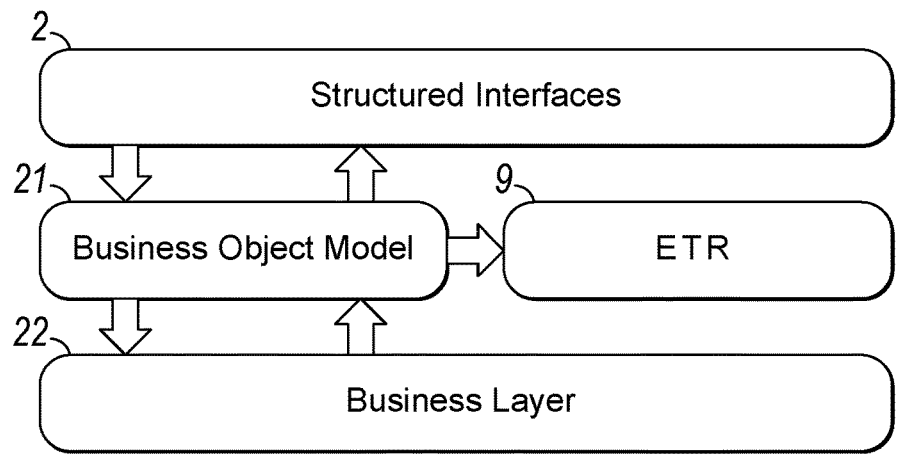
FIG. 6 is a diagrammatic view of the structure of an internal application executing in the content management system according to certain embodiments.

FIG. 6 schematically represents the structure of an internal application of the content management engine 3, according to certain embodiments of the invention, in which the non-standard data container is a business object model 21. The internal application may be a standalone application or an application in a chain of applications (forming related applications). The internal application may include structured interfaces 2, a business object model 21, and a business layer 22.

The structured interfaces 2 represent the way applications communicate with each other. The structured interfaces 2 may convey the functional data to be processed by the applications, and may be mapped into the business object model 21 that is used by the business layer 22 to perform validation actions and operate. A validation action corresponds to functional checks and grammatical checks on the data performed by the business layer 22. After validation, the data elements can be inserted into the extended record data structure 9 in a structured manner.

As a consequence, a modification in the data structures of the extended PNR 9 may involve a modification of the application business object model 21 and a modification of its structured interfaces 2. Further, to benefit from the data structure modifications, the possible other related applications may need to also adapt their business object model 21 and structured interfaces 2, and to integrate the new version of the data model in the interfaces of the other modules.

The various embodiments of the invention make it possible to limit the costs related to such modification by using the non-standard data container model.

Figure 7:
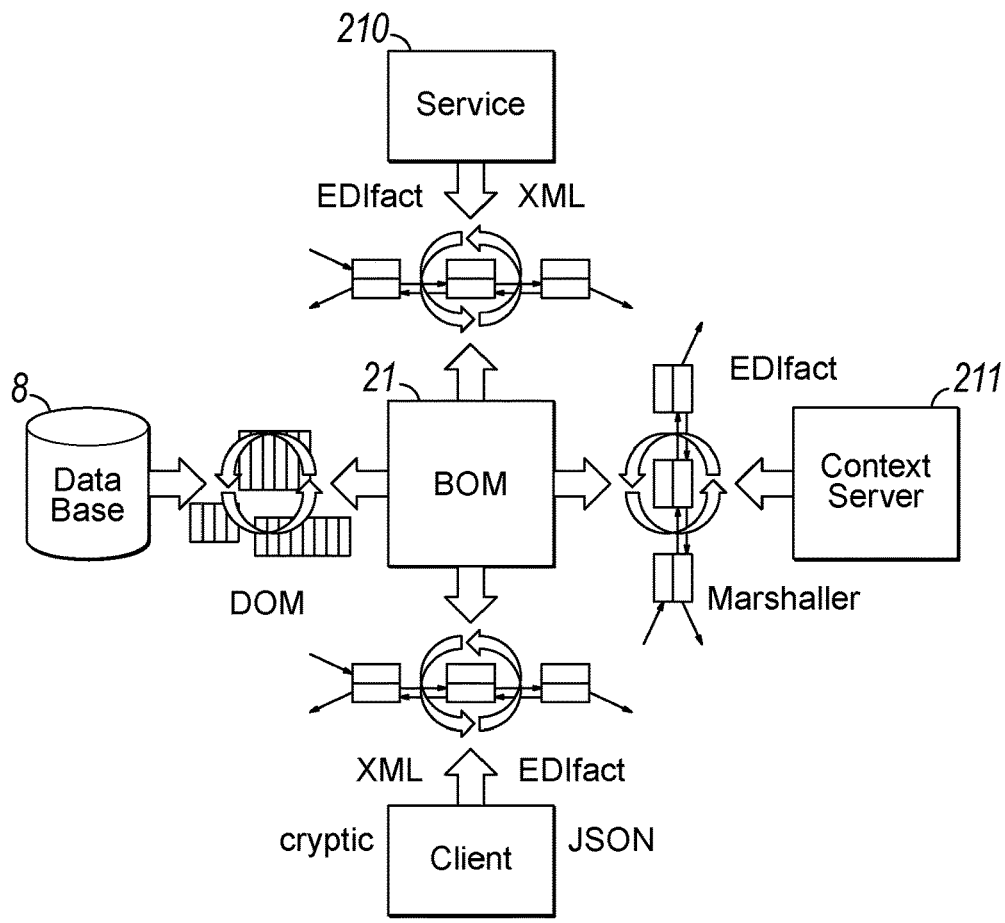
FIG. 7 is a schematic view depicting the operation of an internal application based on technical objects of business model object type.

Travel services applications running in content management engine 3 may operate according to the diagram of FIG. 7. BOM 21 represents the business object model 21 used to represent the internal data model used by the application. The service 210 represents any structured message received by the travel management system 100 (such as an XML or Edifact message) from a client device 7, a non-standard travel provider 5, or a traveler device 6 that can be targeted by the application. The context server 211 represents the contextual storage of the data (also referred to as a "context") used by the application between asynchronous interactions with other applications. Data from the context may be saved in the database 8 in response to a request either periodically or contingent on certain conditions.

Figure 8:
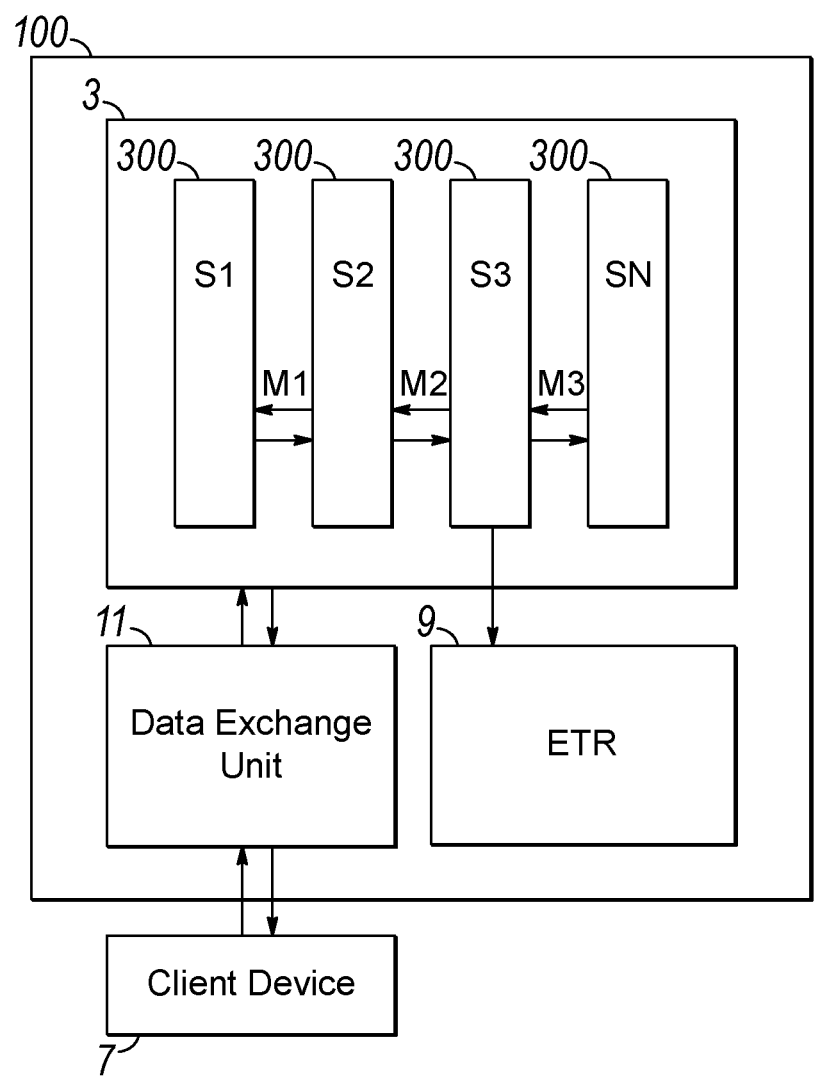
FIG. 8 is a diagrammatic view of the content management system depicting exemplary interactions between internal applications.

FIG. 8 illustrates the interactions between chained applications S1 to SN in the content management engine 3, according to certain embodiments. When the travel management system 100 is operated in a distributed architecture, the chained internal applications S1 to SN in charge of the processes may then call each other, which may result in several duplication of the architecture of FIG. 7 into a number of application servers 30 (also referred to as back-end servers). Each application server 30 is then associated with a respective chained application Si. At each step of the chain of processes, in conventional approaches, the data conveyed from the first backend server 30 for application S1 to the last server 30 for application Sn are transformed, encoded, and decoded in different manners before passing from one server 30 to another server 30 in the middle of the processes. Each backend server 30 further decodes the incoming data elements and validates the data for its dedicated process before accessing the data elements. Then, the data are encoded to be transmitted to the next application Si+1 in the chain. Further, the business object model 21 may be involved in the process of filling and retrieving information into or from the structured interfaces 2 and may be used to write/read data. In conventional approaches, it requires hand-coded components to write/read data into/from the structured interfaces 2 and the central record repository. Accordingly, a single change into the data model may be costly. Further, the data elements that the applications are manipulating generally have a lot of functional constraints so that each application may be required to ensure that the data manipulated are in a suitable format, compatible with industry constraints (validation).

As a result, in conventional approaches, each time a data element has to be modified in such chained applications, all the steps of the process can be impacted as each process has to transmit the new data to the next process and therefore will have to decode it, validate it and encode it. Further, when new content is to be added to an existing application, each process has further to transmit the new content to the next process and each process in the chain has to decode, validate, and encode the new element.

The invention according to certain embodiments improves the situation by using the self-serialization property of the non-standard data container of BOM type.

Specifically, a non-standard data container may be created by a first application S1 in the chain, in response to the reception of data elements D1, D2 and D3 from non-standard content providers 5. Such non-standard content cannot be stored in the standard PNR 90 as such as the content does not comprise data types and attributes complying with the standard structure of the PNR 90. The non-standard content may take various forms and be associated with various types and attributes.

The first application S1 may create for example the non-standard container for each non-standard data element $D_k$ in the format F1 of the first internal application S1 (e.g., protocol buffers). The first application S1 then passes the non-standard container to the next application in the chain using a message M1 using the auto serialization/deserialisation properties of the non-standard container. The message M1 may be a blob carrying auto-serialization/deserialization information. The second application S2 may then extract the non-standard data container in the format F2 of the internal application S2. Similarly, the second application may transmit the non-standard container to the other applications in the chain using messages M2, M3, etc. carrying the auto-serialization/deserialization information until an application Sn triggers the creation of a record in the ETR 9.

Accordingly, by using a non-standard data container, no code change is required to add new data structures to the ETR 9, to update data structure, or transmit a data element in a chain of internal applications. Further, there is no need to modify existing data structures. Data contained by the non-standard data container can be made available without the need to extract and convert it from a format into another. Intermediate/hand-coded layers can be therefore reduced.

Figure 9:
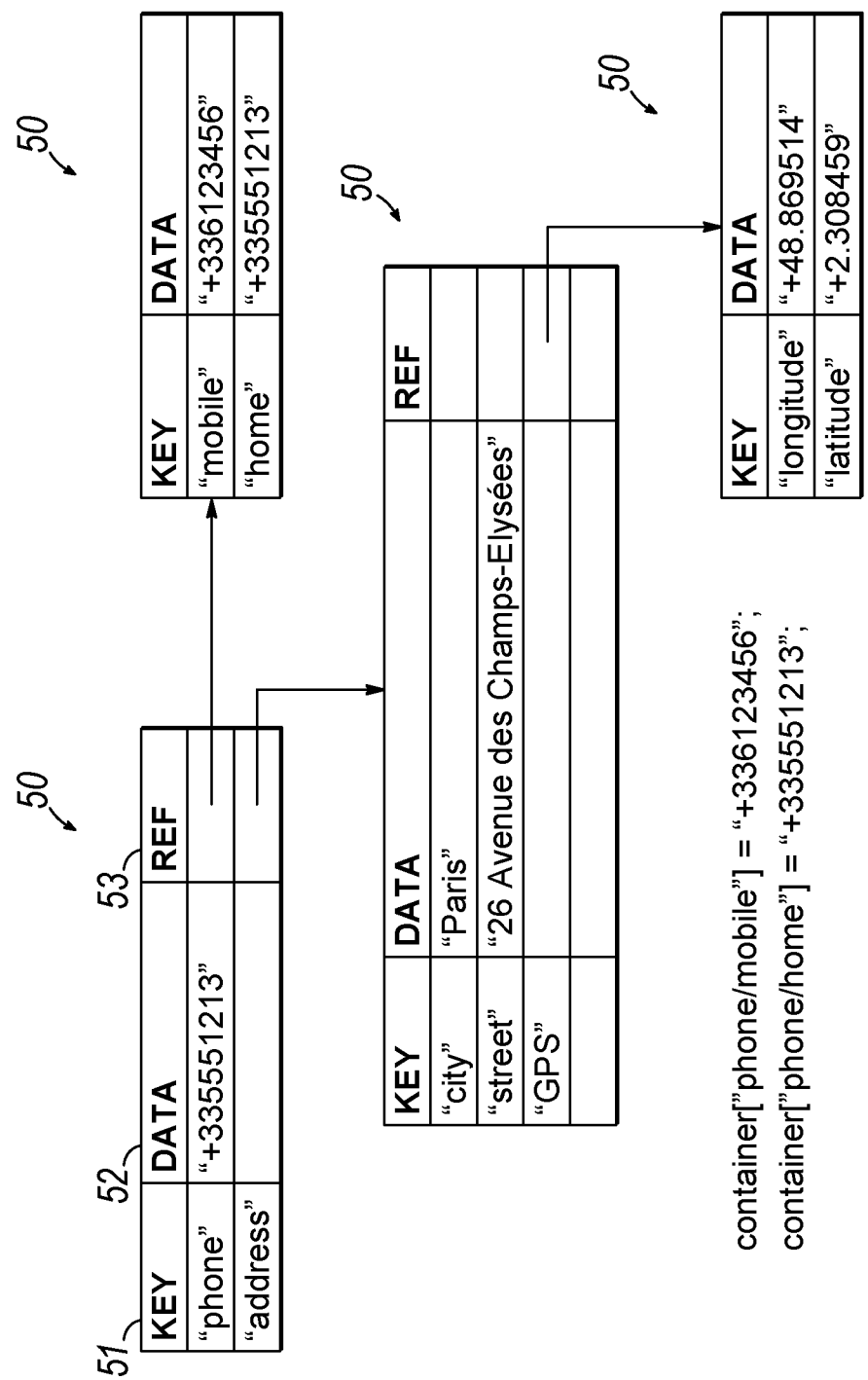
FIG. 9 is a schematic view of an exemplary non-standard data container defined by a set of keys-values.

As depicted in the example of FIG. 9, a non-standard data container 50 may be defined by a set of keys-values that describe a business object model which can be manipulated by applications. Each key 51 defines an attribute of the BOM and comprises an associated value 52 (also referred to in FIG. 9 as "data"). For example, the non-standard data container defined by the key "city" is associated with the value "Paris". The data container may comprise complex structures and be associated with any kind of data. For example, one or more keys of the data container may be further associated with a reference 53 (referred to as "REF" in FIG. 9) to associate a given data container with a set of related data containers. For example, the data container designated by the couple key/value "phone/+335551213" comprises a reference ("REF") to the following data containers: "mobile/+336123456" and "home/+335551213".

The non-standard data container 50 allows access to the content management engine 3 in write mode for any of the data elements contained in the non-standard data container, without the need to develop an accessor to allow such access. This ensures flexibility and scalability.

Further, access to the data element contained in the non-standard data container can be performed by the content management engine 3 at any time of an application processing by using queries according to a suitable query language, such as Xpath.

The non-standard data container may be programmatically backward and forward compatible. From a programming perspective, no code change is required to use a new version of the data elements structures associated with the non-standard data container.

The non-standard data container is configured to support serialization/deserialization. In particular, serialization may be performed at creation and modification time of one or several attributes of the non-standard content to encode the data container in an extensible format and deserialization may be performed each time an application needs to read at least one attribute of a non-standard content.

Specifically, the non-standard data container keys and values can be serialized at any time by translating the state of the technical object (e.g., BOM) representing the non-standard data container into a format (e.g., binary representation) that can be stored and reconstructed by a deserialization mechanism to restore the data container to its original state. The non-standard data container can accordingly be transformed into any target format independent of the data contained in the data container. The serialization and deserialization mechanisms do not require hard-coding. Serialization information may be embedded in a library associated with the Data Container. The use of such BOM thus natively provides that a serialization mechanism which may be supported for any kind of structure defined by the keys of the non-standard data container, without requiring specific coding. In certain exemplary embodiments, the representation format of the non-standard data container used to translate its state according to the serialization/deserialization mechanisms may be based for example on XML, ASCII, JSON, binary formats, as illustrated in FIG. 10.

Validation of the values of the non-standard data container may be needed only at creation and modification time of the data element represented by the non-standard data container object. Accordingly, a read process is not needed to re-validate the data elements associated to the keys.

With the use of the non-standard data container, the information related to the content type (e.g., air, taxi, sport show, parking, urban transportation, etc.) can be conveyed into the non-standard data container itself. The type of the non-standard data container may be stored as a key directly in the non-standard data container.

In some embodiments, the validation mechanism at creation or modification of a given non-standard data container may be based on the functional type stored in the non-standard data element as a key instead of the C++ type as in conventional approaches.

In certain embodiments, each type of non-standard data container may be associated a structure description file (e.g., XSD) describing attribute structure of the data element (attribute layout, attribute dependencies, attribute format, etc.).

The structure description file (e.g., XSD) further represents the interrelationship between the attributes and the elements of a non-standard data container represented as a technical object (e.g., XML object). Within a XSD schema associated with a non-standard data container, the different keys/values of the non-standard data container and the auxiliary constraints applied to it can be described using a set of XML tags. The structure description files may be used at creation and modification of non-standard data containers. In addition, auxiliary constraints may be applied to the non-standard data container using the structure description file (e.g., XSD).

The structure description file associated with each non-standard data container may be used to validate the non-standard data container attributes at the creation or the modification of the non-standard data container. The validation mechanism may include verifying if the non-standard data element represented by the non-standard data container adheres to the description of the data element in which the content is to be placed. In certain embodiments, the validation mechanism may be implemented to validate if the data stored in the non-standard data container matches a target format by using the structure description file associated with the non-standard data container.

The travel management system 100 may maintain a table for storing the data type of the non-standard data container in correspondence with the structure description file associated with the non-standard data container. The table may be updated at run time of the processes.

The content management engine 3 may be configured to add new data into a non-standard data container by updating the structure description files (e.g., XSD) describing the non-standard data container structure, such as new attributes.

The structure description file (e.g., XSD) defining a non-standard data container can be modified without having to hard-code the changes and recompile the code. The modification of a non-standard data container is thus dynamic and updatable at run time.

Figure 11:
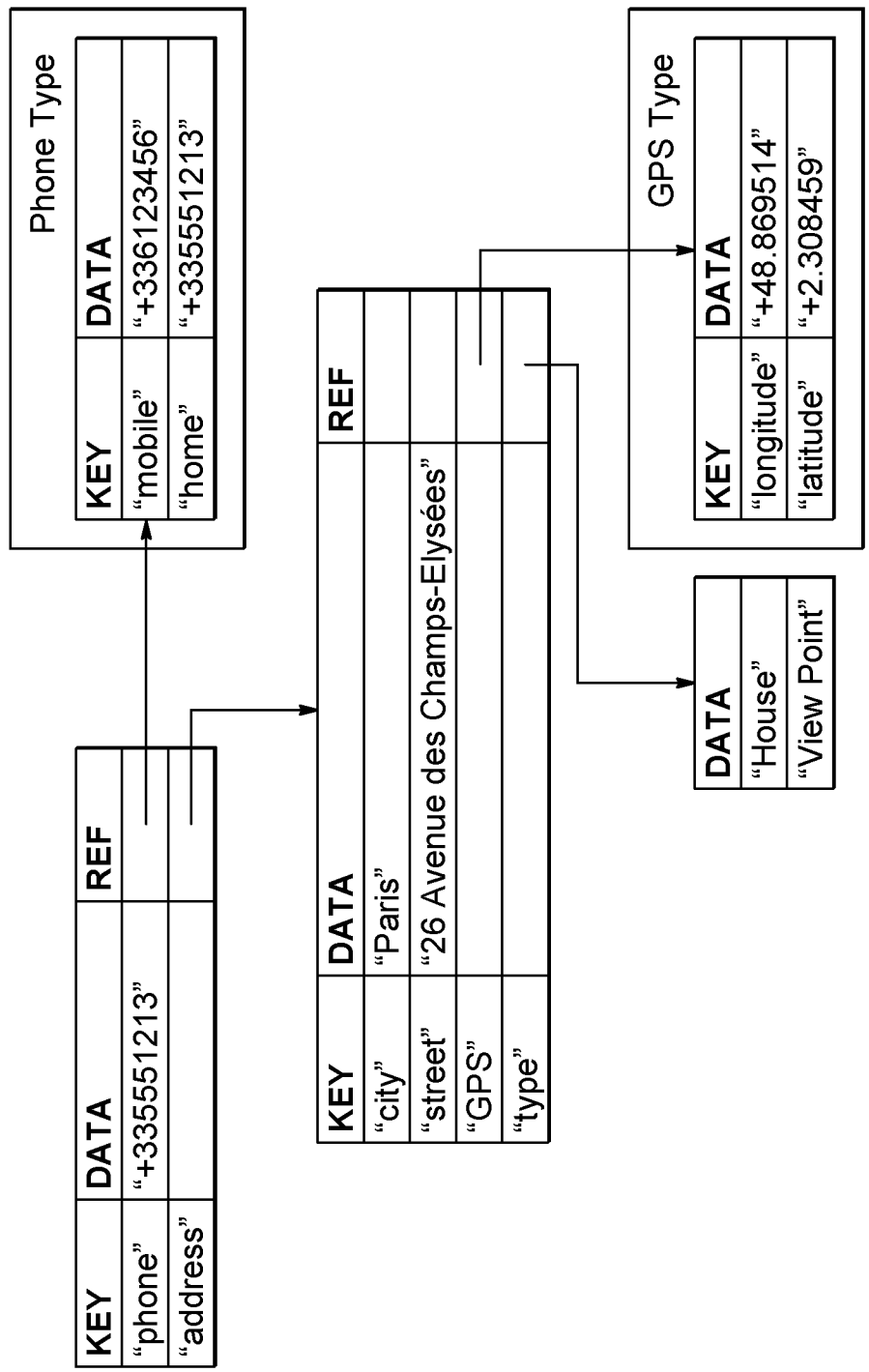
FIG. 11 is a schematic view of the exemplary non-standard data container of FIG. 9 with type information included in the non-standard data container.

FIG. 11 is a schematic view of the exemplary non-standard data containers of FIG. 9 showing their respective types: phone type, address type, GPS type. The information type may be stored as an attribute in the non-standard data container. Such information may be used to retrieve the structure description file associated with a non-standard data container.

FIG. 12 illustrates XSD description files that have different types ("PhoneType", "AddressType", "GPSType") associated with the exemplary non-standard data containers of FIG. 11.

According to certain embodiments, the content management engine 3 may further generate a set of internal service interfaces 2 in the unique platform exposed by the travel management system 100 to the client devices 7, independent of the type of content returned to a client device 7 and the applications maintained by the content management engine 3.

The extended travel record 9 may be used by a large number of applications. For example, the content management engine 3 may comprise a set of applications (e.g., travel applications) for delivering different types of travel services to the client devices 7 based on external content received from standard travel providers systems 4 (e.g., air products) and from any other travel provider system 5 (e.g., non-air products) independent of the type of the content. Such services may include, for example, shopping, booking, pricing, issuance, refund, etc. These service applications may be executed in response to service requests from systems (e.g., travel agencies systems 70) connected to the travel management system 100 through a client device 7 without a need to adapt each application to the N types of data added to the ETR 9 by hard-coding.

The results may be returned through the data exchange unit 11 using response messages in a given format such as XML messages. The internal service interfaces 2 generated by the travel management system 100 may thus be of XML type.

To obviate the need for recoding and recompiling each application to support any number of new types of non-standard data containers, a generic element having a unique type (generic element type) may be used. The generic element is a mega data container configured to contain non-standard data container of any type. The generic element may be seen by all the service applications as a container of a unique type (referred to hereinafter as a "generic element type") while the generic element can contain an unlimited number N of non-standard data types.

Each application may thus instantiate the generic element to be able to manipulate the non-standard containers seamlessly independently of the type of the data element contained in the data container. Accordingly, each application does not need to instantiate as many non-standard data containers as new data types.

As a result, addition of new content type into the non-standard PNR 91 does not impact or require adaptation to the applications handled by the content management engine 3 to assure backward compatibility (e.g., by hard-coding).

Figure 13:
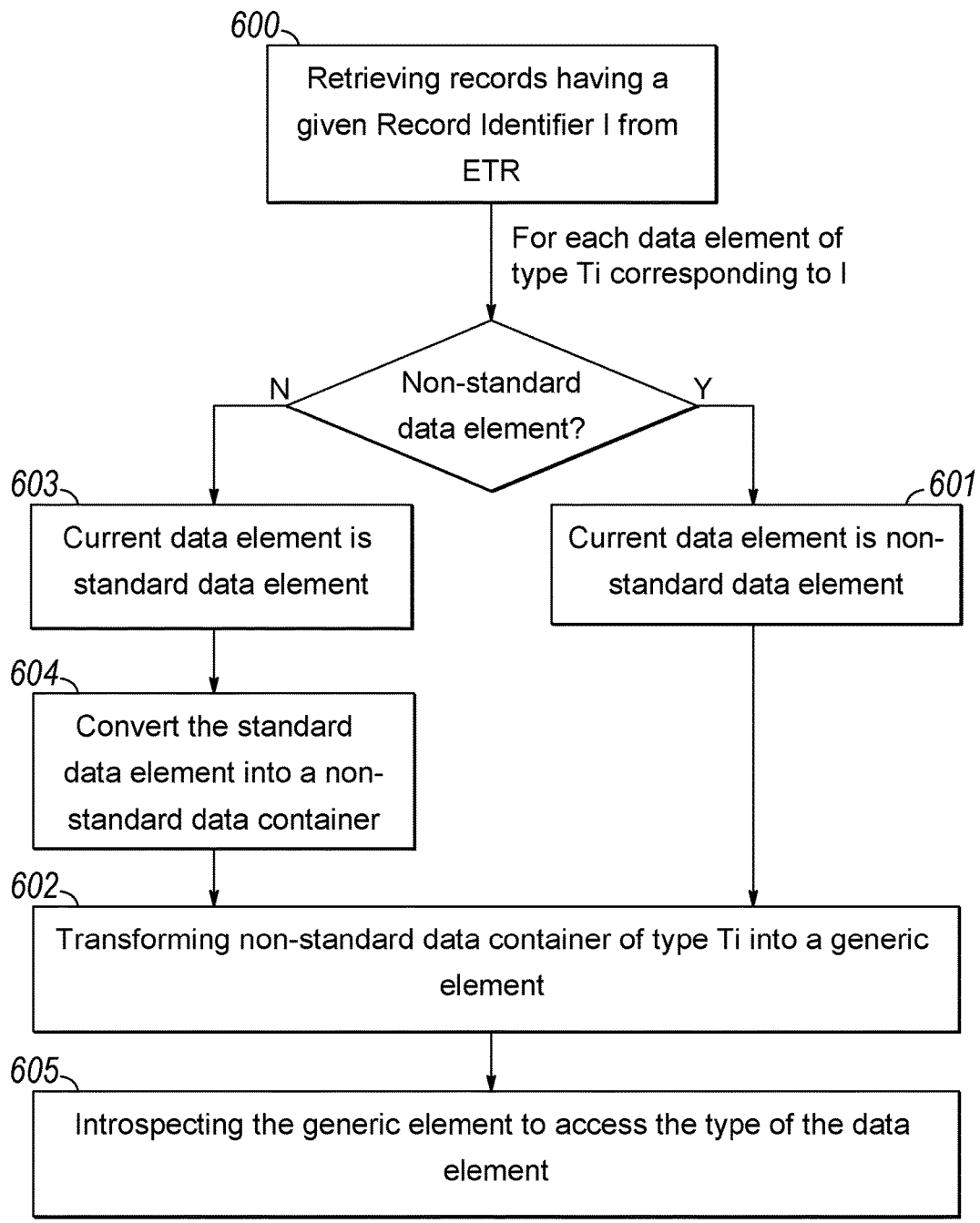
FIG. 13 is a flowchart of a process that may be executed for content access by an application.

FIG. 13 is a flowchart depicting the access to records from the ETR 9 having a given record identifier I by an application. For example, the record identifier I may include a standard data element SD1 of type T1, a standard data element SD2 of type T2, a non-standard data element NSD3, contained in a non-standard data container, of type T3, and a non-standard data element NSD4, contained in a non-standard data container, of type T4.

In block 600, the records associated with the record identifier I are retrieved from the ETR 9. The records may be associated with standard data elements (SD1, SD2) having and non-standard data elements NSD3, NSD4 (non-standard data containers) having respective types T1, T2, T3, T4.

Each data element SD1, SD2, NSD3 and NSD4 is then processed separately. Specifically, for each data element (e.g., NSD3), if the data element is a non-standard data element (block 601), the non-standard data element of type T3 is transformed into a generic element of a unique generic element type containing the non-standard data element of type T3 in block 602. The generic element as a mega-data container may contain itself a non-standard data container having a specific type. The generic element may be implemented as a technical object such as a BOM, and may be based on the same technology as the non-standard data container.

If the data element is a standard data element (block 603) such as for example SD1, the standard data element of type T1 may be converted into a non-standard data container of the same type T1 in block 604.

In block 602, the non-standard data element thus obtained is then transformed into a generic element of a unique generic element type containing the non-standard data element of type T1 corresponding to the standard data element NSD1.

The generic element forms a transitory state of the non-standard data element which makes it possible for the application to manipulate the standard data elements and the non-standard data elements seamlessly independent of their types. The application can thus manipulate the data elements of the ETR 9 without knowing the type of the non-standard content explicitly as if they had a unique type.

In block 605, if the execution of the application requires that one or more data elements be sent to the interface of the client device 7 originating the service request, the application may introspect the generic element to access to the type of the data element.

In certain embodiments of the invention, the non-standard data elements may be associated with respective tags. In such embodiments, in block 601, only the non-standard data elements associated with respective tags may be selected by the application and transformed in a generic element.

The generic element accordingly abstracts the type of the non-standard data elements. Instead of defining a new element type each time a new type of content has to be handled by the applications (new content added in the ETR 9), each application can thus instantiate a unique generic element capable to support any new content type and attributes.

Returning to FIG. 3, the travel management system 100 may be adapted to exchange any type of content (standard and non-standard content) with any external client device such as a travel agency system 70, a non-standard travel provider system 5, or any other backend server inside the same GDS through the internal interfaces 2.

In conventional approaches, the travel management system 100 can exchange data from a standard PNR with other target client devices (e.g., travel providers systems, travel agency systems) having their own standard for the format of the PNR content (target PNR content format) by implementing hard-coding conversion into the standard format supported by the interface of the target client device. This requires an encoding mechanism at the travel management system 100 and decoding/validation mechanisms at the target device. Indeed, each travel management system 100 may have its own standard for the format of the PNR content (source PNR content format) and, hence, the interfaces of the target devices only support such format. Such conversion (encoding/decoding/validation) currently involves hard-coding and recompilation, in a costly and static approach.

The data exchange unit 11 allows for the reception or the transmission of a data exchange message from an external client device according to the second data exchange format 15 to exchange any type of content. In a preferred embodiment, the second data exchange format 15 is a markup description language such as XML. Each data exchange message corresponding to a non-standard data element comprises a structure description file defining the attributes of the data element (attribute layout and format), such as an XSD for XML messages, and a set of values corresponding to the values of the attributes.

Figure 14:
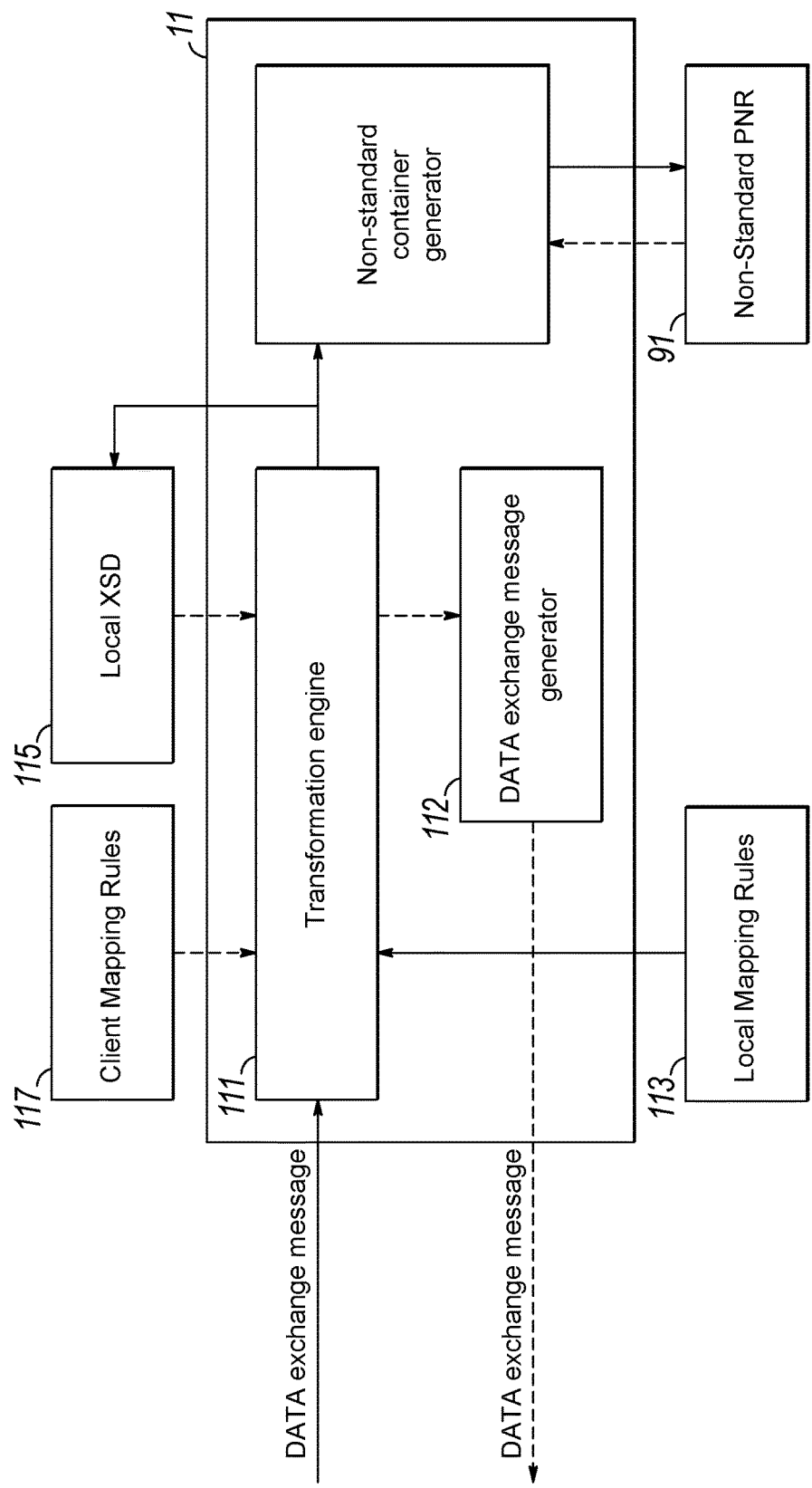
FIG. 14 is a diagrammatic view of an exemplary content exchange unit.

FIG. 14 represents in more details the structure of the data exchange unit 11 according to certain embodiments. The data exchange unit 11 may be used to exchange data elements with an external client device such a non-standard travel provider 5, a travel agency system, or another non-GDS system. In particular, the data exchange unit 11 may be used to receive non-standard data elements from a client device, or transmit data elements from the ETR 9 to a client device.

The data exchange unit 11 may comprise a structure transformation engine 111, such as an XSLT engine, for transforming a structure description file such as an XSD from a source structure description file XSD1 into a target structure description file XSD2 and a data exchange message generator 112 for transmitting the data in the form of a message defined according to a description language such as XML. The XSLT engine may use predefined local mapping rules 113 (e.g., XSLT style sheets) defining transformation rules for transforming a source structure description file XSD1 in reception mode or predefined client mapping rules 117 (e.g., XSLT style sheets) defining transformation rules for transforming a source structure description file XSD1 in transmission mode The travel management system 100 may maintain or load dynamically at run time one or more predefined local structure description files 115 associated with different content types and corresponding to structures description files to be applied locally by the travel management system 100.

In reception mode, the data exchange unit 11 may receive an incoming data exchange message XML1 from an external client device 7 complying a source structure description file XSD1 defined by the external client device 7. The incoming message XML1 contains a non-standard data element of a given type Ti.

Each time such an incoming data exchange message XML1 including a non-standard data element is received by the travel management system 100, the transformation engine 111 may transform the structure description file XSD1 of the incoming message into a target structure description file XSD2 using the local mapping rules 113 associated with the type of the data element contained in the data exchange message XML1. The target structure description file XSD2 is then added to the set of local structure description files 115.

The data exchange unit 11 may further apply a validation mechanism to the incoming message XML1 before transforming the source structure description file XSD1 into the target structure description file XSD2 to validate a number of conditions related to the attributes of the structure description file XSD1 (e.g., presence of mandatory attributes).

The non-standard data container of type Ti may be then generated by mapping the fields of the data exchange message XML1 to the primitives of the non-standard data container. The non-standard data container is then added to the ETR 9 in association with the target structure description file (XSD2) stored in 115 for type Ti as described in relation with FIG. 5. Any update or addition of new content in the ETR 9 can be done at run time.

The use of the data exchange unit 11 thus makes it possible to convert dynamically any incoming data exchange message received from the content provider systems 4, 5 into several non-standard data container objects representing the elements to be added/modified, without requiring any code change.

In transmission mode (dotted lines), the travel management system 100 may transmit any data element from the ETR into the target interface of an external client device 7 through the data exchange unit. In transmission mode, the data exchange unit 11 receives as input a non-standard data container (containing a non-standard data element or a standard data element of type Ti previously converted into a non-standard data container).

The non-standard data container of type Ti is associated with a structure description file (referred to as source structure description file) comprising a description of the attributes (key) of the non-standard data container, of the layout of the attributes and of the attribute format, such as an XSD file 115. A non-standard data container is also associated with key values corresponding to the values of the attributes.

If the data element to be transmitted by the travel management system 100 includes a non-standard data container of a given type Ti from the ETR 9, the transformation engine 111 may transform the structure description file XSD3 associated with the non-standard data container in the local structure description files 115 into a target structure description file XSD4 by using the client mapping rules 117 associated with the type of the non-standard data element. The client mapping rules 117 define the transformation rules towards the format of the interface of the target client device 7, for example for display to the graphical user interfaces (GUI) of the target client device 7.

If the data element to be transmitted to the client device 7 is a standard data element (e.g., GDS elements) of type Ti, the standard data element may be previously converted into a non-standard data container of the same type using the data container converter 12. The standard data element may then be sent to the data exchange unit 11 in the form of a non-standard data container for transmission to the target client device 7.

Figure 15:
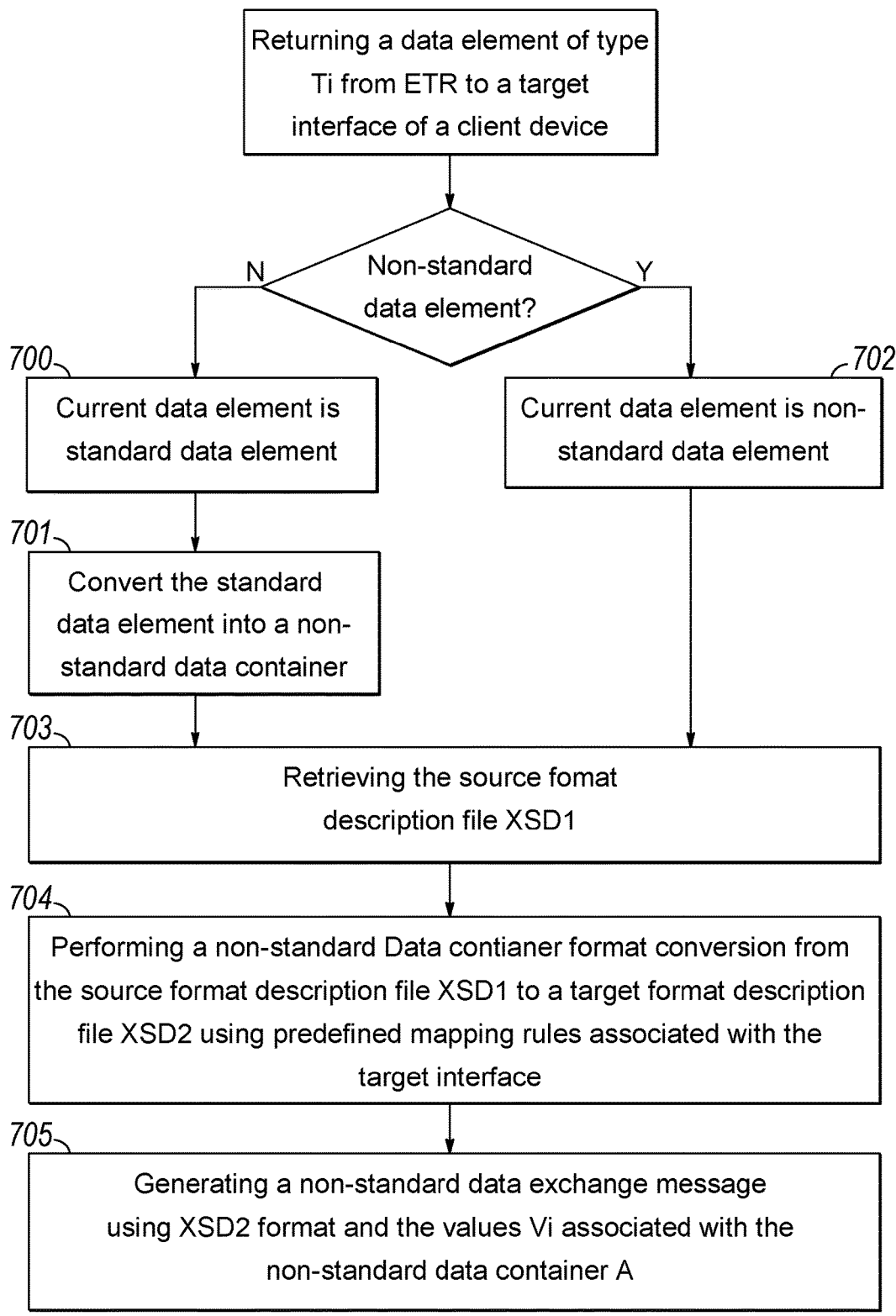
FIG. 15 is a flowchart of a process that may be executed to transmit content to a client device.

FIG. 15 depicts a flowchart for transmitting a data element of type Ti to the target interface of a client device 7 (graphical user interface or GUI), according to certain embodiments. If the data element is a standard data element (block 700), the standard data element of type Ti may be converted into a non-standard data container of the same type Ti in block 701 (similar to block 604 of FIG. 13). The standard data element is then processed in block 703 in the form of a non-standard data container of type Ti, associated with a structure description file XSD1 and key values Vi. If the data element is a non-standard data element in the form of a non-standard data container of type Ti (block 702) associated with a structure description file XSD1 and key values Vi, the non-standard data element of type Ti is directly processed in block 703.

In block 703, the source structure description file XSD1 associated with the non-standard data container is retrieved. In block 704, the source structure description file XSD1 is converted into a target structure description file XSD2 using the mapping engine 110 (e.g., XSLT engine) to parse the source structure description file XSD1 and convert the parsed fields into a target structure description file XSD2 using the mapping rules 113 (e.g., XSLT style sheets). The mapping rules 113 are defined according to the format of the target interface of the client device 7.

In block 705, the XML message containing the data element to be transmitted to the client device is generated by adding the values Vi associated with the non-standard data container. The XML message is sent to the target interface of the client device 7 through the network 13. The target interface may be dynamically and transparently adapted in response to the response of the XML message.

The external client devices 7 may further extract the data element contained in the XML message and store according to its own standard without a need to apply a decoding and complex validation mechanism to the data, independent of the type of the data and the format of the target interface.

By using non-standard data containers associated with structure description files (XSD) and having the ability to serialize themselves as a data exchange message in any format 15 (e.g., XML), new kinds of interfaces 2 can thus be built.

In one embodiment, the data exchange unit 11 may be used by the content management engine 3 to generate dynamically a consistent representation of request results to the interface of a client device 7 (e.g., travel agency system) independent of the type of content (standard, non-standard, mixed content), with as little hand coded software as possible.

The service applications can directly use a homogeneous data structure to store the data in the interfaces 2. This obviates the need for exchanging between the interface layers and the BOMs layers yet another format of the data structure. This further allows reducing the overhead between the data stored in the extended travel record and the data representation in the service interfaces exposed to the client devices 7 (e.g., travel agency systems) through a unique platform.

Specifically, the method of FIG. 13 may be applied to generate a representation of results in response to a service request from a client device 7 (e.g., travel agency system 70) and display of such representation on the user graphical interface associated with the service on the client device interface, while ensuring that the representation is homogeneous independent of the content type (standard content or non-standard content).

When a record identifier associated with non-standard content and/or standard content is added in the extended record data structure 9, the service applications are adapted to dynamically and homogeneously generate a representation of record independent of the new type.

The application of the content management engine 3 corresponding to the service request may access to the records corresponding to the result obtained from the ETR according to the access method of FIG. 12 using the generic element.

The implementation of the access to the non-standard data containers 50 based on the unique generic element independent of the type of content to be returned to the client device 7 allows each application to support any type of content from non-standard content provider systems 5. The applications in the content management engine 3 are thus independent from the type of content.

To return the results to the interface of the travel agency system 70, the application may introspect the generic element to access the non-standard data container (block 605 of FIG. 6). The non-standard data container thus accessed may thus be returned according to the method of FIG. 14.

The content management engine 3 is thus adapted to provide a unique platform to all client devices 7 comprising a set of interfaces per service (e.g., travel service) representing a unique response independently of the type of products that are to be manipulated (e.g., classical GDS air product (flight)/GDS car rental/non-GDS taxi/non-GDS restaurant . . . ).

To facilitate the integration of new content in an application, the internal service interface 2 associated with the application may have a set of common attributes for each content family. This enables new elements of an already existing content family to benefit from all the displaying functions available for the family. Specifically, the underlying data structure of the non-standard data container 50 may share a common format within a specific element category. For example, the format description file XSDi used to represent a data element of the type airline segment may be the same regardless of whether it was booked through the travel management system 100 or via another external booking system. It may also share a set of common data with elements from another category (e.g., transportation category).

In particular, the transformation engine 111 may be defined such that, for a given record identifier I1 in the ETR 9 associated with both a non-standard data element and a standard data element, if the non-standard data element and the standard data element are of a same general type (e.g., "hotel"), a same representation may be generated for both data elements at the target interface of the external client device 7 (e.g., travel agency system) by mapping the structure description file XSD1 associated with the non-standard data element and the structure description file XSD2 associated with the standard data element to a same structure description file of the common type complying with the target interface.

Figure 16:
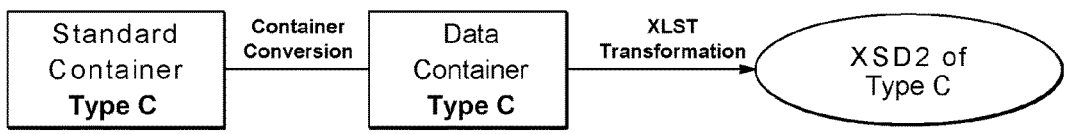
FIG. 16 is a schematic view of an XSLT conversion of a standard data container of type C.
Figure 17:
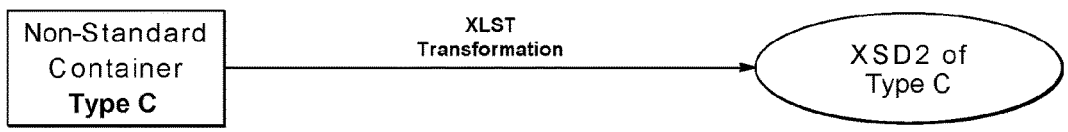
FIG. 17 is a schematic view of an XSLT conversion of a non-standard data container of the same type C as the standard data container of FIG. 16.

For example as depicted in FIG. 16, a standard data element of type TYPE C is first converted into a non-standard container associated with the same type TYPE C (block 701 of FIG. 17) and then a representation (XSD2) is generated to the client device for the TYPE C using the transformation engine 111 and mapping rules 117 defined for the TYPE C at the client device (style sheets). As shown in the example of FIG. 17, the same representation (XSD2) will be used for a non-standard container of type TYPE C.

Also, the transformation rules 117 may be defined such that attributes of the same type in any data element will be mapped to a same sub-representation independent of the content type (non-standard or standard) which comprises the attributes (in the target description file).

Figure 18:
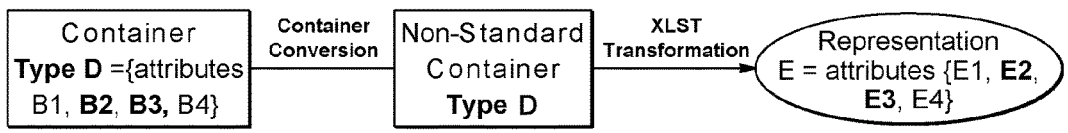
FIG. 18 is a schematic view of an XSLT conversion of a standard data container of type D comprising a set of attributes.

In the example depicted in FIG. 18, a standard container of type TYPE D comprising a set of attributes B1, B2, B3, B4 (as defined in the source structure description file XSD1) is first converted into a non-standard container associated with the same type TYPE D (block 701 of FIG. 15) and then a representation XSD2 (target structure description file) is generated to the client device for the TYPE D using the transformation engine 111, the representation XSD2 comprising representation attributes {E1, E2, E3, E4} corresponding to the source attributes {B1, B2, B3, B4}.

Figure 19:
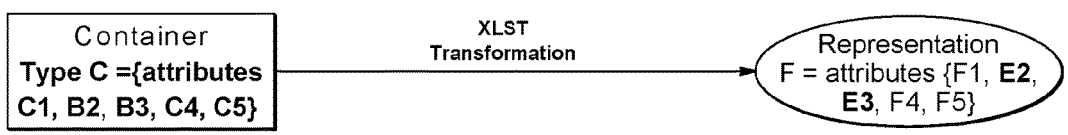
FIG. 19 is a schematic view of an XSLT conversion of a non-standard data container of type E having some attributes identical to the attributes of the standard data container of FIG. 18.

As shown in the example of FIG. 19, the same representation {E2, E3} may be generated for the attributes B2, B3 of a non-standard container of another type TYPE C comprising the set of attributes {C1, B2, B3, C4} by applying same mapping rules 117 for similar attributes of a source structure definition file XSD. The mapping engine 110 will thus generate a representation XSD3={F1, E2, E3, F4, F5} with the same representation E2 and E3 respectively for the attributes B2 and B3.

The content management engine 3 accordingly provides a unique platform to all client devices 7 (associated with, for example, travel agency systems) including a set of interfaces per application though which a unique response can be generated independent of the type of content that is to be manipulated (e.g., GDS flight product, GDS car rental, non-GDS taxi, non-GDS restaurant, etc.).

The service applications can thus directly use a homogeneous data structure to store the data in the interfaces. This obviates the need for exchanging between the interface layers and the BOMs layers yet another format of the data structure. This further allows reducing the overhead between the data stored in the extended travel record 9 and the data representation in the service interfaces 2 exposed to the client devices 7 (e.g., travel agency systems) through a unique platform.

Accordingly, the data exchange unit 11 makes it possible to generate dynamically a consistent representation of the results independent of the type of content (standard, non-standard, mixed content), with as little hand coded software as possible. In particular, the data exchange message used to return the results to the client device 7 has a format close to the internal structures (e.g., XML) and this format is inherited from the structure description files (e.g., XSD) used to define the elements themselves in the generic Element.

The content management system 100 thus provides a set of interfaces per travel service representing a unique response independently of the type of products that are to be manipulated (e.g., classical GDS air product (flight)/GDS car rental/non-GDS taxi/non-GDS restaurant, etc.)

Figure 20:
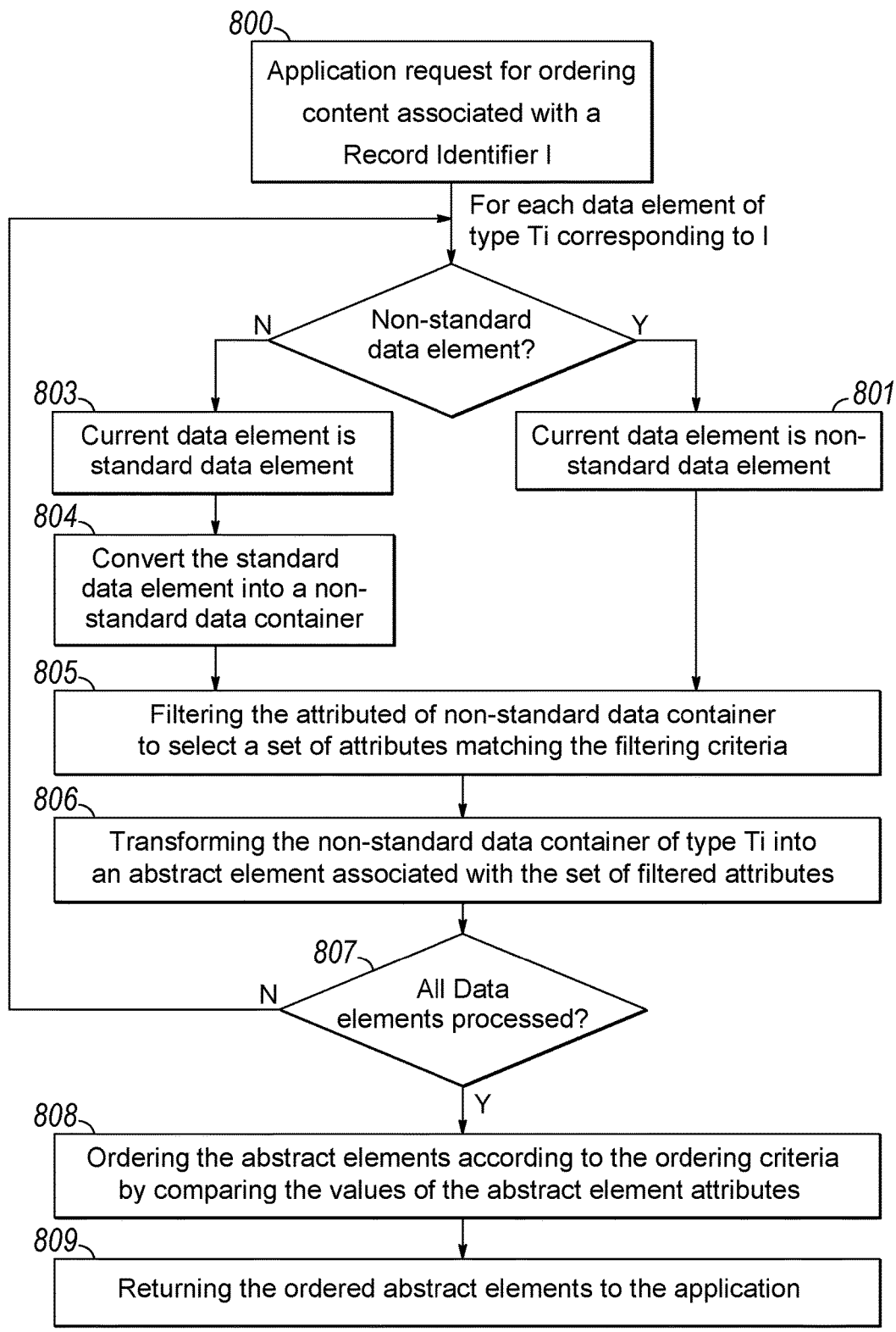
FIG. 20 is a flowchart of a process that may be executed to rearrange data elements.

FIG. 20 depicts a flowchart of a content rearrangement method according to certain embodiments. Content associated with a common record identifier in the ETR 9 includes a set of data elements related to the same travel. Depending on the application requiring a particular record identifier in the ETR 9, the application may require that the different data elements associated with a given record locator be arranged (e.g., ordered) according to predefined rearrangement criteria (e.g., reordering criteria) when accessed by the application, and may sent a request for ordering content associated with a record identifier I (block 800).

The content rearrangement method may be implemented to rearrange the data elements according to predefined rearrangement criteria predefined by the application such as a chronologic order, a ranking criteria, etc. The rearrangement method may merge the standard and non-standard data elements into an abstract ranking model based on an abstract element. The abstract element may be used to sort the data elements according to the rearrangement criteria. The application can thus return merged data element ordered according to the target interface constraints. This may result, for example, in aggregated itinerary documents where PNR segments and extended elements (non-standard content) can be merged in the same view.

Specifically, for each data element, if the data element is a non-standard data element (block 801), the non-standard data element of type Ti is eventually transformed into an abstract element of a unique type containing a subset of the attributes of the non-standard data element of type Ti in block 806. The attributes of the non-standard data container are filtered according to filtering rules generated, for example, based on the rearrangement criteria (e.g., chronologic order the filtering criteria will select date attributes). The abstract element may be implemented as a technical object such as a BOM, and may be based on the same technology as the non-standard data container and/or the generic element. It should be noted that the generic element and the abstract element both allow abstraction of the type of a data element.

If the data element is a standard data element (block 803) of type Ti, it may be converted into a non-standard data container of the same type Ti in block 804 (similarly to step 604 of FIG. 13). In block 805, the attributes of the non-standard data element thus obtained are filtered according to filtering criteria. In block 806, the non-standard data element obtained in block 804 is transformed into an abstract element containing the filtered set of attributes of the non-standard data element of type Ti corresponding to the standard data element of type Ti. After all data elements are processed in block 807, the abstract elements are ordered according to the ordering criteria by comparing the values of the abstract element attributes (block 808). In block 809, the ordered abstract elements are returned to the application.

Similar to the generic element, the abstract element obtained forms a transitory state of the non-standard data element that makes it possible to abstract the data container type. It further enables a global manipulation of the filtered data elements attributes by the application independent of their types by introspecting the abstract model and specifically arrange them according to the rearrangement criteria.

In the travel field, the standard PNR 90 may be stored in a storage area that is shared between a plurality of systems. Standard data elements maintained in the standard PNR 90 may be of different types and each data element may have its own serialization format. Standard data elements may share a same record identifier if the data elements are related (for example, are common to the same passenger or itinerary).

Similarly, a data element in the non-standard PNR 91 may share the same record identifier as another data element in the non-standard PNR 91 or the standard PNR if the data elements are related. The non-standard PNR 91 may be stored in the same storage area as the standard PNR. Alternatively, the standard PNR 90 and the non-standard PNR 91 may be stored in different storage areas. The two areas may be managed by a global management mechanism in order to allow synchronization of common data. The global management mechanism may be implemented to link the storage area dedicated to the non-standard PNR 91 to the other storage area dedicated to the standard PNR 90 on every query that needs to manipulate the whole extended travel record 9.

Even if the ETR 9 is split into two record data structures 90 and 91, the ETR 9 can be managed globally based on the common record identifiers identifying related data elements, auxiliary container data, and/or record data structure information.

The auxiliary data container data may comprise control information as regards each data container (e.g., creation date, last modification date, etc.). In conventional approaches, this information is stored directly in each standard data container in association with record identifier 0 and may be accessed to manage the standard PNR (for example to purge periodically the standard PNR). However, such an approach does not allow an optimized management of the two record data structures 90 and 91.

Figure 21:
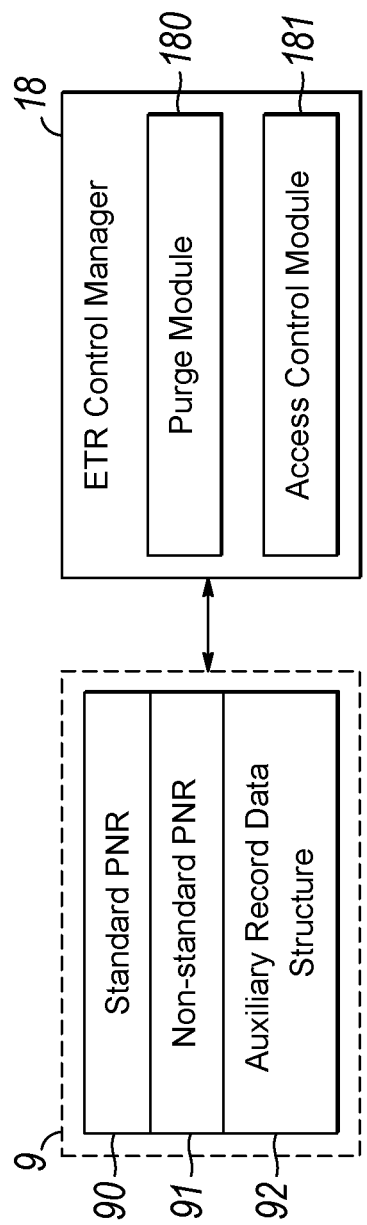
FIG. 21 is a diagrammatic view of an extended record data structure, according to certain embodiments.

FIG. 21 represents the structure of the ETR 9 according to certain embodiments. As shown, to optimize the global management of the two record data structures 90 and 91, in some embodiment, the extended travel record 9 may further comprise an auxiliary data structure 92 (also referred to as a "central management data structure" or "central management area") for maintaining auxiliary container data related to each data container created in the ETR 9, such as the creation date of a data container, the last modification date of a data container, etc. The information maintained in the auxiliary data structure 92 may be used to manage both areas in a synchronous way. Each entry in the auxiliary data structure 92 may share the same record identifiers as the data containers created in the ETR 9. Further, each record in the auxiliary data structure 92 may be associated with a set of auxiliary container data related to the data containers maintained in the ETR 9 (having the same record identifier). The auxiliary data structure 92 may be filled with data container information contained in the standard record data structure 90 and non-standard record data structure 91.

In some embodiments, each entry of the auxiliary data structure 92 may comprise the set of auxiliary attributes related to the data containers sharing the same record identifier in the extended record data structure 9. Each entry may comprise an auxiliary data container for storing the set of auxiliary container data related to the records of the ETR 9 sharing the same record identifier. The set of auxiliary container data may comprise control attributes representing control information related to the records of the ETR 9 sharing the same record identifier, such as the previous date of purge of the record.

In some embodiments, the data container information related to all the records of a given record data structure 90 or record data structure 91 may be maintained in a dedicated record (also referred to as a "container information record") in this record data structure 90 or record data structure 91, and may be assigned a particular record identifier (for example record identifier 0). The container information record of the standard record data structure 90 and/or the container information record of the non-standard record data structure 91 may be copied to the non-auxiliary data structure 92 at different time intervals, for example periodically or in response to a query or alternatively each time the ETR 9 is saved in the one or more databases 8.

The auxiliary data structure 92 may further maintain record data structure information related to the standard record data structure and/or to the non-standard record data structure, such as version information identifying the last version of the standard record data structure 90 and of the non-standard record data structure 91 in the databases.

The travel management system 100 may comprise an ETR control unit 18 for managing the ETR 9 based on the data comprised in the auxiliary data structure 92 (auxiliary container data information and/or the standard record data structure information 90 and/or the non-standard record data structure information 91).

In one embodiment, the ETR control unit 18 may comprise a purge module 180 configured to periodically purge records from the standard PNR 90 and from the non-standard PNR 91 in a synchronous way for common data, using the common record identifiers, the auxiliary container data maintained in the auxiliary data structure 92, and/or the record data structure information.

In certain embodiments, the ETR control unit 18 may comprise an access manager 181 to handle simultaneous access to a same record identifier in standard PNR 90 and in non-standard PNR 91 based on the data maintained in the auxiliary data structure 92. In such embodiment, the auxiliary data structure may further maintain version information identifying the last version of the Standard Record data structure 90 and the non-standard Record data structure 91 in the databases 8. For example, each time the ETR 9 is saved in the database from the context, the version information is updated in the auxiliary data structure 92. The access manager 18 may be configured to manage access to the ETR 9 based on the version information maintained in the auxiliary data structure 92.

In general, the routines executed to implement the embodiments of the invention, whether implemented as part of an operating system or a specific application, component, program, object, module or sequence of instructions, or even a subset thereof, will be referred to herein as "computer program code," or simply "program code". Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

The program code embodied in any of the applications/modules described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

These computer program instructions may also be stored in a computer readable medium that can direct a computer, other types of programmable data processing apparatus, or other devices to function in a particular manner, such that the instructions stored in the computer readable medium produce an article of manufacture including instructions that implement the function/act specified in the block or blocks of the flowchart and/or block diagram.

The computer program instructions may also be loaded onto a computer, other programmable data processing apparatus, or another device to cause a series of computations to be performed on the computer, the other processing apparatus, or the other device to produce a computer implemented process such that the executed instructions provide one or more processes for implementing the functions/acts specified in the flowchart and/or block diagram block or blocks.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of" or variants thereof are used in either the detailed description or the claims, such terms are intended to be inclusive in a manner similar to the term "comprising".

While all of the present invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. For example, while the abstract element has been described for rearranging content, it may be used more generally by the internal applications for accessing content for different kinds of operations. The filtering rules applied to filter attributes of a data container may vary depending on the intended operations. Accordingly, departures may be made from such details without departing from the spirit or scope of the Applicant's general inventive concept.

What is claimed is:

1. A method of managing content in a travel management system, the method comprising:
   receiving, from one or more content providers, a standard data element and a non-standard data element comprising the content;
   receiving, from the one or more content providers, a first XSD structure description file, wherein one or more first XML tags complying with the first XSD structure description file describe an attribute structure of the non-standard data element and one or more second XML tags complying with the first XSD structure description file describe one or more auxiliary constraints associated with the non-standard data element;
   creating a first data container for the standard data element in an extended record data structure, the first data container including a common record identifier and first data values for first attributes corresponding to the standard data element;
   creating, based at least in part on the one or more first XML tags, a second data container for the non-standard data element in the extended record data structure, the second data container including the common record identifier and second data values corresponding to second attributes for the non-standard data element;
   applying, based at least in part on the one or more second XML tags, the one or more auxiliary constraints to the second data container;
   configuring a plurality of applications to use the second data container to access the non-standard data element, wherein the applications are executable by the travel management system in response to requests received by the travel management system;
   managing access of each application to the first container and the second container in the extended record data structure based on the common record identifier, wherein the standard data element satisfies International Air Transport Association (IATA) constraints and is obtained from a global distribution system operating as the travel management system, and the non-standard data element fails to satisfy the IATA constraints and is obtained from a source other than the global distribution system;
   transforming, through XSLT transformation, the first XSD structure description file into a second XSD structure description file using predefined mapping rules, wherein the first XSD structure description file and the second XSD structure file define corresponding attributes; and
   creating, based at least in part on the second XSD structure description file, a third data container for the non-standard data element.

2. The method of claim 1 wherein the second data container comprises a plurality of keys and a plurality of values, each key corresponding to one of the second attributes of the non-standard data element.

3. The method of claim 2 wherein one of the keys of the second data container defines a type for each non-standard data element.

4. The method of claim 2 wherein the second data container is a business object model, the business object model being self-implemented.

5. The method of claim 4 wherein the second data container comprises a self-serialization mechanism for serializing itself into an application target format, and a library embedding serialization information for serializing or deserializing the second data container.

6. The method of claim 1 further comprising:
providing an application access to the second container by generating a generic container to which is assigned a unique generic type, the generic container containing the second data container.

7. The method of 6 further comprising:
introspecting the non-standard data element to permit the application to access the generic type assigned to the generic container.

8. The method of claim 6 further comprising:
providing the application access to the first data container by converting the standard data element into another non-standard data element and adding the converted standard data element to the generic container.

9. The method of claim 1 wherein the standard record data structure and the non-standard record data structure are stored in a shared storage area within the travel management system.

10. The method of claim 1 wherein the standard record data structure and the non-standard record data structure are stored in different storage areas within the travel management system.

11. The method of claim 1 wherein the content may be received by a plurality of chained applications at a content aggregator, the non-standard data element is transmitted between the chained applications through messages carrying self-serialization information, and the second data container is stored in the extended travel record when triggered by one of the applications.

12. An apparatus for managing content in a travel management system, the apparatus comprising:
at least one processor; and
a memory coupled to the at least one processor and including instructions that, when executed by the at least one processor, cause the apparatus to:
receive, from one or more content providers, a standard data element and a non-standard data element comprising the content;
receive, from the one or more content providers, a first XSD structure description file, wherein one or more first XML tags complying with the first XSD structure description file describe an attribute structure of the non-standard data element and one or more second XML tags complying with the first XSD structure description file describe one or more auxiliary constraints associated with the non-standard data element;
create a first data container for the standard data element in an extended record data structure, the first data container including a common record identifier and first data values for first attributes corresponding to the standard data element;
create, based at least in part on the one or more first XML tags, a second data container for the non-standard data element in the extended record data structure, the second data container including the common record identifier and second data values corresponding to second attributes for the non-standard data element;
apply, based at least in part on the one or more second XML tags, the one or more auxiliary constraints to the second data container;
configure a plurality of applications to use the second data container to access the non-standard data element, wherein the applications are executable by the travel management system in response to requests received by the travel management system;
manage access of each application to the first container and the second container in the extended record data structure based on the common record identifier, wherein the standard data element satisfies International Air Transport Association (IATA) constraints and is obtained from a global distribution system operating as the travel management system, and the non-standard data element fails to satisfy the IATA constraints and is obtained from a source other than the global distribution system;
transform, through XSLT transformation, the first XSD structure description file into a second XSD structure description file using predefined mapping rules, wherein the first XSD structure description file and the second XSD structure file define corresponding attributes; and
create, based at least in part on the second XSD structure description file, a third data container for the non-standard data element.

13. The apparatus of claim 12 wherein the second data container comprises a plurality of keys and a plurality of values, each key corresponding to one of the second attributes of the non-standard data element.

14. The apparatus of claim 13 wherein one of the keys of the second data container defines a type for each non-standard data element.

15. The apparatus of claim 13 wherein the second data container is a business object model, the business object model being self-implemented.

16. The apparatus of claim 15 wherein the second data container comprises a self-serialization mechanism for serializing itself into an application target format, and a library embedding serialization information for serializing or deserializing the second data container.

17. The apparatus of claim 12 wherein the instructions, when executed by the at least one processor, further cause the apparatus to:
provide an application access to the second container by generating a generic container to which is assigned a unique generic type, the generic container containing the second data container.

18. The apparatus of claim 17 wherein the instructions, when executed by the at least one processor, further cause the apparatus to:
introspect the non-standard data element to permit the application to access the generic type assigned to the generic container.

19. The apparatus of claim 17 wherein the instructions, when executed by the at least one processor, further cause the apparatus to:
provide the application access to the first data container by converting the standard data element into another non-standard data element and adding the converted standard data element to the generic container.

20. The apparatus of claim 12 wherein the standard record data structure and the non-standard record data structure are stored in a shared storage area within the travel management system.

21. The apparatus of claim 12 wherein the standard record data structure and the non-standard record data structure are stored in different storage areas within the travel management system.

22. The apparatus of claim 12 wherein the content may be received by a plurality of chained applications at a content aggregator, the non-standard data element is transmitted between the chained applications through messages carrying self-serialization information, and the second data container is stored in the extended travel record when triggered by one of the applications.

23. A computer program product for managing content in a travel management system, the computer program product comprising:
a non-transitory computer readable storage medium; and
instructions stored on the non-transitory computer readable storage medium that, when executed by a processor, cause the processor to:
receive, from one or more content providers, a standard data element and a non-standard data element comprising the content;
receive, from the one or more content providers, a first XSD structure description file, wherein one or more first XML tags complying with the first XSD structure description file describe an attribute structure of the non-standard data element and one or more second XML tags complying with the first XSD structure description file describe one or more auxiliary constraints associated with the non-standard data element;
create a first data container for the standard data element in an extended record data structure, the first data container including a common record identifier and first data values for first attributes corresponding to the standard data element;
create, based at least in part on the one or more first XML tags, a second data container for the non-standard data element in the extended record data structure, the second data container including the common record identifier and second data values corresponding to second attributes for the non-standard data element;
apply, based at least in part on the one or more second XML tags, the one or more auxiliary constraints to the second data container;
configure a plurality of applications to use the second data container to access the non-standard data element, wherein the applications are executable by the travel management system in response to requests received by the travel management system;
manage access of each application to the first container and the second container in the extended record data structure based on the common record identifier, wherein the standard data element satisfies International Air Transport Association (IATA) constraints and is obtained from a global distribution system operating as the travel management system, and the non-standard data element fails to satisfy the IATA constraints and is obtained from a source other than the global distribution system;
transform, through XSLT transformation, the first XSD structure description file into a second XSD structure description file using predefined mapping rules, wherein the first XSD structure description file and the second XSD structure file define corresponding attributes; and
create, based at least in part on the second XSD structure description file, a third data container for the non-standard data element.

* * * * *